United States Patent
Fang et al.

(10) Patent No.: US 12,457,608 B2
(45) Date of Patent: Oct. 28, 2025

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Yun Fang, Guangdong (CN); Zhihua Shi, Guangdong (CN); Wenhong Chen, Guangdong (CN); Jiejiao Tian, Guangdong (CN); Yingpei Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 427 days.

(21) Appl. No.: 18/088,619

(22) Filed: Dec. 26, 2022

(65) Prior Publication Data
US 2023/0137907 A1 May 4, 2023

Related U.S. Application Data

(63) Continuation of application No. PCT/CN2020/116913, filed on Sep. 22, 2020.

(51) Int. Cl.
*H04W 72/1273* (2023.01)
*H04W 72/23* (2023.01)

(52) U.S. Cl.
CPC ....... *H04W 72/1273* (2013.01); *H04W 72/23* (2023.01)

(58) Field of Classification Search
CPC ............. H04W 72/1273; H04W 72/23; H04W 72/232; H04W 72/0446; H04W 48/12; H04L 5/0023; H04L 5/0053
See application file for complete search history.

(56) References Cited

U.S. PATENT DOCUMENTS 11,337,203 B2 * 5/2022 Raghavan ............. H04L 5/0091
2019/0253904 A1 * 8/2019 Tsai ....................... H04W 16/14
(Continued)

FOREIGN PATENT DOCUMENTS

| CN | 110167091 | 8/2019 |
| CN | 111212437 | 5/2020 |
| CN | 111543095 | 8/2020 |

OTHER PUBLICATIONS

Fujitsu, "Ambiguities about beam indication in some cases", 3GPP TSG RAN WG1 Meeting #Ad-hoc R1-1800126, Jan. 22-26, 2018, pp. 1-7.
(Continued)

*Primary Examiner* — Rasheed Gidado
(74) *Attorney, Agent, or Firm* — Hodgson Russ LLP

(57) ABSTRACT

Embodiments of the present application provide a wireless communication method, a terminal device, and a network device. The method comprises: the terminal device receives at least one PDCCH sent by the network device according to a plurality of TCI states, the at least one PDCCH being used for scheduling a same first channel or a same first signal; the terminal device determines a TCI state of the first channel or the first signal according to information of a first DCI carried on the at least one PDCCH and at least one time interval between the at least one PDCCH and the first channel or the first signal. Accordingly, provided is a method for determining the TCI state of the scheduled channel or signal in the case of sending the at least one PDCCH according to the plurality of TCI states.

18 Claims, 5 Drawing Sheets

(56) References Cited

U.S. PATENT DOCUMENTS

| | | | |
|---|---|---|---|
| 2019/0297640 A1* | 9/2019 | Liou | H04L 5/001 |
| 2019/0342907 A1 | 11/2019 | Huang et al. | |
| 2020/0267571 A1 | 8/2020 | Park et al. | |
| 2021/0219336 A1* | 7/2021 | Fan | H04L 5/0094 |
| 2023/0217458 A1* | 7/2023 | Bang | H04W 48/12 370/329 |

OTHER PUBLICATIONS

NTT Docomo et al., "Remaining issues on multi-TRP/panel transmission", 3GPP TSG RAN WG1 #101 R1-2004395, May 25-Jun. 5, 2020, pp. 1-16.

ZTE, "Draft CR1 to TS 38.214 on QCL indication for PDSCH with slot aggregation", 3GPP TSG RAN WG1 Meeting #95 R1-1813914, Nov. 12-16, 2018, pp. 1-2.

Intel Corporation, "Remaining Issues on Beam Management", 3GPP Tsg Ran WG1 Meeting #94b R1-1810751, Oct. 8-12, 2018, pp. 1-15.

"Search Report of counterpart Europe application No. 20954398.2", issued on Oct. 16, 2023, p. 1-p. 10.

ZTE, "Clarification on the case of configured TCI states without QCL-TypeD", 3GPP TSG RAN WG1 Meeting #97 R1-1906257, May 17, 2019, pp. 1-3.

3GPP, "3rd Generation Partnership Project; Technical Specification Group Radio Access Network; NR; Physical channels and modulation (Release 16)", 3GPP TS 38.211 V16.2.0, Jun. 2020, pp. 1-131.

3GPP, "3rd Generation Partnership Project; Technical Specification Group Radio Access Network; NR; Multiplexing and channel coding (Release 16)", 3GPP TS 38.212 V16.2.0, Jun. 2020, pp. 1-151.

3GPP, "3rd Generation Partnership Project; Technical Specification Group Radio Access Network; NR; Physical layer procedures for control (Release 16)", 3GPP TS 38.213 V16.2.0, Jun. 2020, pp. 1-176.

3GPP, "3rd Generation Partnership Project; Technical Specification Group Radio Access Network; NR; Physical layer procedures for data (Release 16)", 3GPP TS 38.214 V16.2.0, Jun. 2020, pp. 1-163.

"International Search Report (Form PCT/ISA/210) of PCT/CN2020/116913," mailed on Jun. 18, 2021, with English translation thereof, pp. 1-4.

"Written Opinion of the International Searching Authority (Form PCT/ISA/237) of PCT/CN2020/116913," mailed on Jun. 18, 2021, pp. 1-4.

* cited by examiner

WIRELESS COMMUNICATION METHOD, TERMINAL DEVICE, AND NETWORK DEVICE

CROSS-REFERENCE TO RELATED APPLICATION

This application is a continuation of international PCT application serial no. PCT/CN2020/116913, filed on Sep. 22, 2020. The entirety of the above-mentioned patent application is hereby incorporated by reference herein and made a part of this specification.

BACKGROUND

Technical Field

Embodiments of the present application relate to the field of communication, and more particularly to a wireless communication method, a terminal device, and a network device.

Description of Related Art

If the channel characteristic on a certain antenna port symbol is derived through another antenna port, the signal transmitted on the certain antenna port here may be referred to as a target reference signal, and the signal transmitted on the other antenna port here may be referred to as a quasi co-location (QCL) source signal. Based on this, it may be seen from the definition of the QCL that for the reception of the target reference signal, the terminal device needs to obtain required large-scale channel parameters from one or more QCL source signals. There are different QCL types between the target reference signal and different QCL source signals, and the large-scale channel parameters involved in different QCL types are not completely the same. To configure the QCL type between the target reference signal and the QCL source signal, new radio (NR) introduces a transmission configuration indicator (TCI) state.

In Release (R) 17, a physical downlink control channel (PDCCH) needs to be enhanced based on multi transmission receive point (multi TRP), and different TRPs may correspond to different TCI states, so there may be a case where multiple PDCCHs perform multiple transmissions according to multiple TCI states and schedule the same PDSCH. Similarly, there is a case where multiple PDCCHs perform multiple transmissions according to multiple TCI states and schedule the same other uplink channel, such as scheduling a physical uplink shared channel (PUSCH) or a physical uplink control channel (PUCCH); there is a case where multiple PDCCHs perform multiple transmissions according to multiple TCI states and schedule the same signal, such as scheduling an aperiodic CSI-RS or an aperiodic sounding reference signal (SRS); or there is a case where one PDCCH performs multiple transmissions according to multiple TCI states and schedules the same channel or the same signal. How to determine the TCI state of the channel or the signal scheduled by the PDCCH is a technical issue to be urgently solved in the present application.

SUMMARY

Embodiments of the present application provide a wireless communication method, a terminal device, and a network device, thereby providing a method for determining a TCI state of a scheduled signal or a triggered signal in a case of sending at least one PDCCH through multiple TCI states.

In a first aspect, a wireless communication method is provided. The method includes: a terminal device receiving at least one PDCCH sent by a network device according to multiple TCI states, and the at least one PDCCH being used to schedule a same first channel or a same first signal; the terminal device determining a TCI state of the first channel or the first signal according to information of first DCI and at least one time interval, wherein the first DCI is DCI carried on the at least one PDCCH; the at least one time interval is a time interval between the at least one PDCCH and the first channel or the at least one time interval is a time interval between the at least one PDCCH and the first signal.

In a second aspect, a wireless communication method is provided. The method includes: a network device determining a TCI state of a first channel or a first signal according to first DCI and at least one time interval, wherein the first DCI is DCI carried on at least one PDCCH sent by the network device according to multiple TCI states; the at least one PDCCH being used to schedule the same first channel or the same first signal, wherein the at least one time interval is a time interval between the at least one PDCCH and the first channel or the at least one time interval is a time interval between the at least one PDCCH and the first signal.

In a third aspect, a wireless communication method is provided. The method includes: a terminal device receiving at least one PDCCH sent by a network device according to multiple TCI states, and the at least one PDCCH being used to schedule a same first channel or a same first signal; the terminal device determining a TCI state of the first channel or the first signal according to information of first DCI, wherein the first DCI is DCI carried on the at least one PDCCH.

In a fourth aspect, a wireless communication method is provided. The method includes: a network device determining a TCI state of a first channel or a first signal according to first DCI, wherein the first DCI is DCI carried on at least one PDCCH sent by the network device according to multiple TCI states; the at least one PDCCH being used to schedule the same first channel or the same first signal.

In a fifth aspect, a terminal device is provided, including: a communication unit and a processing unit. The communication unit is used to receive at least one PDCCH sent by a network device according to multiple TCI states, and the at least one PDCCH is used to schedule a same first channel or a same first signal. The processing unit is used to determine a TCI state of the first channel or the first signal according to information of first DCI and at least one time interval. The first DCI is DCI carried on the at least one PDCCH, and the at least one time interval is a time interval between the at least one PDCCH and the first channel or the at least one time interval is a time interval between the at least one PDCCH and the first signal.

In a sixth aspect, a network device is provided, including: a processing unit, used to determine a TCI state of a first channel or a first signal according to first DCI and at least one time interval. The first DCI is DCI carried on at least one PDCCH sent by the network device according to multiple TCI states. The at least one PDCCH is used to schedule the same first channel or the same first signal. The at least one time interval is a time interval between the at least one PDCCH and the first channel or the at least one time interval is a time interval between the at least one PDCCH and the first signal.

In a seventh aspect, a terminal device is provided, including: a communication unit and a processing unit. The communication unit is used to receive at least one PDCCH sent by a network device according to multiple TCI states, and the at least one PDCCH is used to schedule a same first channel or a same first signal. The processing unit is used to determine a TCI state of the first channel or the first signal according to information of first DCI. The first DCI is DCI carried on the at least one PDCCH.

In an eighth aspect, a network device is provided, including: a processing unit, used to determine a TCI state of a first channel or a first signal according to first DCI. The first DCI is DCI carried on at least one PDCCH sent by the network device according to multiple TCI states. The at least one PDCCH is used to schedule the same first channel or the same first signal.

In a ninth aspect, a terminal device is provided, including a processor and a memory. The memory is used to store a computer program. The processor is used to call and run the computer program stored in the memory to execute the method in the first aspect, the third aspect, or an implementable manner thereof.

In a tenth aspect, a network device is provided, including a processor and a memory. The memory is used to store a computer program. The processor is used to call and run the computer program stored in the memory to execute the method in the second aspect, the fourth aspect, or an implementable manner thereof.

In an eleventh aspect, an apparatus is provided for implementing the method in any one of the first aspect to the fourth aspect or an implementable manner thereof.

Specifically, the apparatus includes: a processor, used to call and run a computer program from the memory, so that a device installed with the apparatus executes the method in any one of the first aspect to the fourth aspect or an implementable manner thereof.

In a twelfth aspect, a computer-readable storage medium is provided for storing a computer program. The computer program enables a computer to execute the method in any one of the first aspect to the fourth aspect or an implementable manner thereof.

In a thirteenth aspect, a computer program product is provided, including a computer program instruction. The computer program instruction enables a computer to execute the method in any one of the first aspect to the fourth aspect or an implementable manner thereof.

In a fourteenth aspect, a computer program is provided. The computer program enables a computer to execute the method in any one of the first aspect to the fourth aspect or an implementable manner thereof when run on the computer.

Through the technical solution of the first aspect or the second aspect, in the case of sending the at least one PDCCH according to the TCI states, the terminal device may determine the TCI state of the first channel or the first signal according to the first DCI carried on the at least one PDCCH and the time interval between the at least one PDCCH and the first channel or the first signal.

Further, when the terminal device obtains one time interval, the terminal device may determine the TCI state of the scheduled channel or the triggered signal according to the TCI state of a CORESET of the first PDCCH, determine the TCI state of the scheduled channel or the triggered signal according to the TCI state of a first CORESET in a first time unit, or determine the TCI state of the first channel or the first signal according to a TCI state indication.

When the terminal device obtains multiple time intervals, the terminal device may determine the TCI state of the first channel or the first signal according to the TCI state of the first CORESET, determine the TCI state of the first channel or the first signal according to the TCI state of CORESETs of multiple PDCCHs, or determine the TCI state of the first channel or the first signal according to the TCI state indication. Alternatively, the terminal device determines a default TCI state configured by the network device as the TCI state of the first channel or the first signal.

DETAILED DESCRIPTION OF DISCLOSED EMBODIMENTS

The technical solutions in the embodiments of the present application will be described below with reference to the drawings in the embodiments of the present application. Obviously, the described embodiments are part, but not all, of the embodiments of the present application. With regard to the embodiments in the present application, all other embodiments obtained by persons skilled in the art without making creative efforts belong to the protection scope of the present application.

Embodiments of the present application may be applied to various communication systems, such as a global system of mobile communication (GSM) system, a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of the NR system, an LTE-based access to unlicensed spectrum (LTE-U) system, an NR-based access to unlicensed spectrum (NR-U) system, a universal mobile telecommunication system (UMTS), wireless local area networks (WLAN), wireless fidelity (WiFi), a next-generation communication system, or other communication systems.

Generally speaking, the traditional communication system supports a limited number of connections and is easy to implement. However, with the development of communication technology, the mobile communication system not only supports traditional communication, but also supports, for example, device to device (D2D) communication, machine to machine (M2M) communication, machine type communication (MTC), vehicle to vehicle (V2V) communication, etc. The embodiments of the present application may also be applied to the communication systems.

Optionally, the communication system in the embodiments of the present application may be applied to a carrier aggregation (CA) scenario, a dual connectivity (DC) scenario, or a standalone (SA) networking scenario.

The embodiments of the present application do not limit the applied frequency spectrum. For example, the embodiments of the present application may be applied to a licensed spectrum or an unlicensed spectrum.

Figure 1:
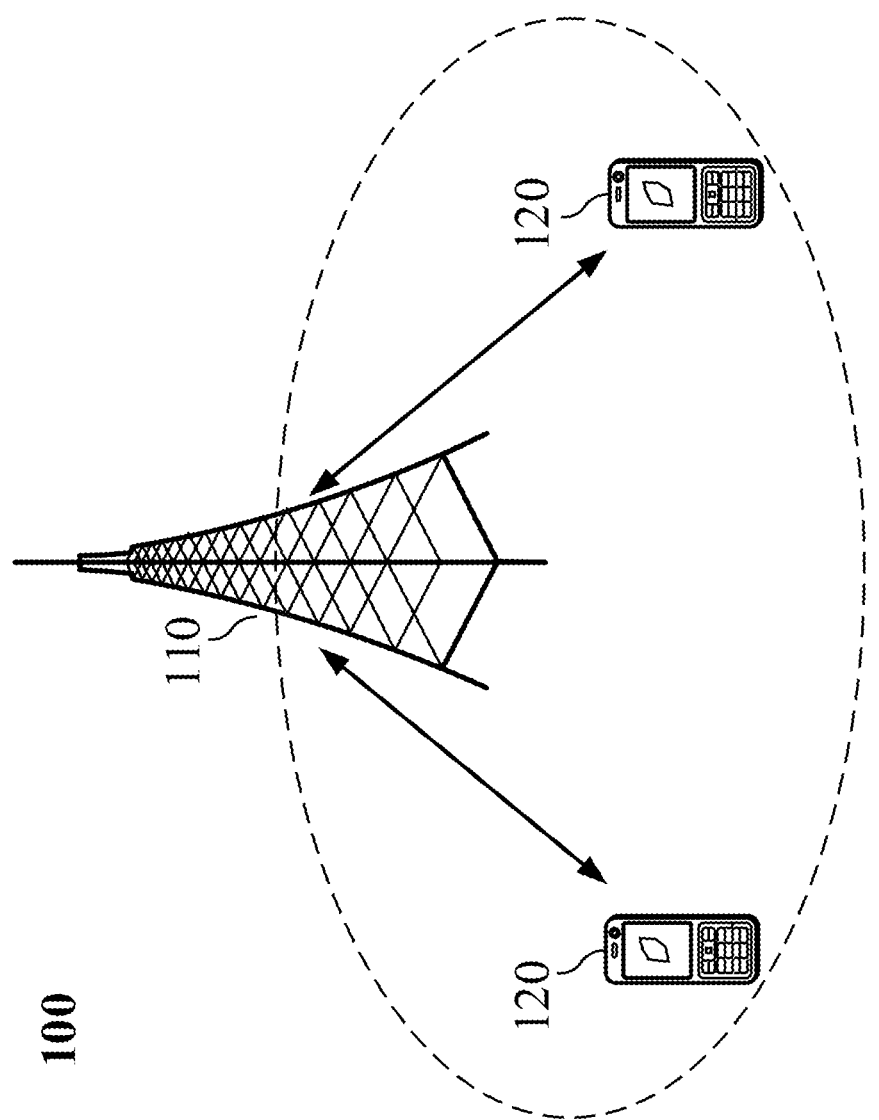
FIG. 1 is a schematic structural diagram of a communication system provided by an embodiment of the present application.

Exemplarily, a communication system 100 applied in the embodiment of the application is shown in FIG. 1. The communication system 100 may include a network device 110. The network device 110 may be a device for communicating with a terminal device 120 (also referred to as a communication terminal or a terminal). The network device 110 may provide communication coverage for a specific geographic area and may communicate with terminal device located within the coverage area.

FIG. 1 schematically shows a network device and two terminal devices. Optionally, a communication system 100 may include multiple network devices, and the coverage range of each network device may include other numbers of terminal devices, which is not limited in the embodiment of the present application.

Optionally, the communication system 100 may further include other network entities such as a network controller and a mobility management entity, which is not limited in the embodiment of the present application.

It should be understood that a device having a communication function in the network/system of the embodiment of the present application may be referred to as a communication device. Taking the communication system 100 shown in FIG. 1 as an example, the communication device may include a network device 110 and a terminal device 120 having the communication function. The network device 110 and the terminal device 120 may be the specific devices described above, which will not be repeated here. The communication device may also include other devices, for example, other network entities such as a network controller and a mobility management entity, in the communication system 100, which is not limited in the embodiment of the present application.

It should be understood that the terms "system" and "network" herein are often used interchangeably. The term "and/or" herein is only used to describe an association relationship of associated objects, which represents that there may be three types of relationships. For example, A and/or B may represent cases where A exists alone, A and B exist at the same time, and B exists alone. In addition, the sign "/" herein generally represents that the previous and next associated objects are in an "or" relationship.

The embodiments of the present application are described in combination with a terminal device and a network device. The terminal device may also be referred to as a user equipment (UE), an access terminal, a user unit, a user station, a mobile station, a mobile platform, a remote station, a remote terminal, a mobile device, a user terminal, a terminal, a wireless communication device, a user agent, a user apparatus, etc. The terminal device may be a station (ST) in a WLAN, a cellular phone, a cordless phone, a session initiation protocol (SIP) phone, a wireless local loop (WLL) station, a personal digital assistant (PDA) device, a handheld device having a wireless communication function, a computing device, other processing devices connected to a wireless modulator-demodulator, an on-board device, a wearable device, and a next-generation communication system, such as a terminal device in an NR network or a terminal device in a future evolution of a public land mobile network (PLMN).

As an example and not a limitation, in the embodiments of the present application, the terminal device may also be a wearable device. The wearable device may also be referred to as a wearable smart device, which is a general term for a wearable device developed by applying wearable technology to intelligently design daily wear, such as glasses, gloves, watches, clothing, and shoes. The wearable device is a portable device that is directly worn on the body or integrated into clothes or accessories of a user. The wearable device is not only a hardware device, but also implements powerful functions through software support, data interaction, and cloud interaction. In a broad sense, the wearable smart device includes, for example, a smart watch, smart glasses, etc., that is full-featured, large-sized, may implement complete or partial functions without relying on smart phones, and various smart bracelets, smart jewelries, etc. for monitoring physical signs that only focus on a certain type of application function and need to be used in cooperation with other devices such as smart phones.

The network device may be a device for communicating with a mobile device. The network device may be an access point (AP) in WLAN, a base transceiver station (BTS) in GSM or CDMA, a node B (NB) in WCDMA, an evolutional node B (eNB or eNodeB), a relay station, or an access point in LTE, a generation node B (gNB) in an on-board device, a wearable device, and an NR network, a network device in a future evolution of a PLMN, etc.

In the embodiments of the present application, the network device provides services for a cell. The terminal device communicates with the network device through a transmission resource (for example, a frequency domain resource or a spectrum resource) used by the cell. The cell may be a cell corresponding to the network device (for example, a base station). The cell may belong to a macro base station or a base station corresponding to a small cell. The small cell here may include a metro cell, a micro cell, a pico cell, a femto cell, etc. The small cells have the characteristics of small coverage range and low emission power and are suitable for providing high-speed data transmission services.

It should be understood that in the present application, a multiple-input multiple-output (MIMO) technology may be adopted.

Before introducing the technical solutions of the present application, the following first introduces the relevant content of QCL, TCI state, and PDCCH:
(1) Relevant Content of QCL The concept of the QCL is introduced with the emergence of the coordinated multiple points (CoMP) technology. Multiple stations involved during a CoMP transmission process may be multiple stations with different geographic locations or multiple sectors with different antenna panel orientations. For example, when the terminal device respectively receives data from different access points, spatial differences in the access points cause differences in large-scale channel parameters of receiving links from different access points. The large-scale channel parameter of the channel directly affects the adjustment and optimization of a filter coefficient during channel estimation.

Therefore, although the differences in spatial locations or angles of the access points are transparent to the terminal device and the CoMP operation, the impact of the spatial difference on the large-scale channel parameter of the channel is an important factor that needs to be considered when the terminal device performs channel estimation and reception detection. With the standardization of the CoMP technology, the LTE system has introduced the concept of the QCL since R11. The QCL mechanism in the LTE system involves channel state information (CSI) measurement, PDSCH demodulation, and PDCCH demodulation.

For the CSI measurement, the terminal device may assume that a channel state information-reference (CSI-RS) port in each CSI-RS is QCL. The CSI-RS and a cell reference signal (CRS) corresponding to high-level configured qcl-CRS-Info are related to the QCL of Doppler shift and Doppler extension parameter.

The QCL means that if channel characteristics on a certain antenna port symbol may be derived from another antenna port, the two ports are deemed to be QCL. The so-called QCL of the two antenna ports in the sense of certain large-scale channel parameters means that the large-scale channel parameters of the two antenna ports are the same. As long as certain large-scale channel parameters of the two antenna ports are consistent, regardless of whether the actual physical locations or the corresponding antenna panel orientations are different, the terminal device may deem the two antenna ports to be at the same location, that is, QCL.

Similar to the LTE system, the large-scale channel parameters considered when setting the QCL in the NR system also include delay spread, average delay, Doppler spread, Doppler shift, and average gain. At the same time, compared with the LTE, the design of the MIMO solution in the NR system needs to consider the use of frequency bands above 6 GHz and the ensuing issue of digital-analog hybrid beamforming. The direction and the width of a simulated beam both affect the large-scale feature of the observed channel. Therefore, a new large-scale channel parameter needs to be introduced in the NR system to characterize the influence of a beam on the channel characteristics.

It should be understood that the large-scale channel parameter in the present application is also described as a QCL parameter.

A spatial RX parameter may characterize the influence of the beam on the channel characteristics and is a new large-scale channel parameter. The parameter may refer to a channel correlation matrix, an emission beam, a receiving beam, an emission/receiving beam, etc. If two antenna ports are QCL in the sense of the spatial RX parameter, it may generally be understood that the same beam may be used to receive data of the two ports.

Similar to the QCL mechanism of LTE, for some typical application scenarios, considering the possible QCL relationship between a target reference signal and a source signal, from the perspective of simplifying signaling, the large-scale channel parameters in NR are divided into the 4 types below:

QCL-TypeA: {Doppler shift, Doppler spread, average delay, average gain}

It should be noted that: For frequency bands below 6 GHz, the spatial RX parameter may not be required.

QCL-TypeB: {Doppler shift, Doppler spread}

This QCL type is only for the following two cases in the frequency band below 6 GHz:

Case 1: When using a narrow beam target reference signal with a wide beam reference signal (that is, source signal) as a QCL reference, for example, a tracking reference signal (TRS) is generally sent with a sector-level wide beam, while the CSI-RS may be sent by adopting a beamforming manner. In this case, it is generally deemed that Doppler parameters (that is, the Doppler shift and the Doppler spread) experienced by signals originating from the same station are still approximately the same. However, scatterers covered by beams with different widths are different, so there will be more significant impact on the delay spread experienced by signal propagation and an average delay parameter. In this case, it cannot be assumed that the CSI-RS and the TRS are QCL in the sense of the delay spread and the average delay parameter.

Case 2: The time domain density of the target reference signal is insufficient, but the frequency domain density is sufficient. For example, when the TRS is used as the QCL reference of the CSI-RS, since the time domain density of the CSI-RS depends on configuration, there may not be enough to accurately estimate a time-varying parameter of the channel, so the Doppler parameter may be obtained from the TRS with QCL. On the other hand, the frequency domain density of the CSI-RS is sufficient for estimating frequency domain parameters such as the average delay and the delay spread, so the parameters may be obtained from the CSI-RS.

QCL-TypeC: {Doppler shift, average delay}

It should be understood that this QCL type is for frequency bands above 6 GHz.

It should be understood that this QCL type is only for a case where a synchronization signal and PBCH block (SSB) is used as a QCL reference. Due to the limited resources and density occupied by the SSB, it is generally assumed that only some rough large-scale channel parameters, that is, the Doppler shift and the average delay can be obtained from the SSB, while other large-scale channel parameters may be obtained from the target reference signal.

QCL-TypeD: {Spatial Rx parameter}

As mentioned earlier, since this parameter is mainly for frequency bands above 6 GHz, the parameter is regarded as a separate QCL type.

It should be understood that for the reception of one target reference signal, the terminal device needs to obtain the required large-scale channel parameters from one or more source signals. For example, the terminal device obtains time and frequency parameters from one source signal and obtains a spatial reception parameter from another source signal. Therefore, before the terminal device receives the target reference signal, the network device needs to configure the QCL relationship between the target reference signal and the source signal through signaling. To configure the QCL relationship between the target reference signal and the source signal, NR introduces the TCI state.

The structure of the TCI state is {RS1| QCL_type1, RS2| QCL_type2} or {RS1| QCL_type1}, where RS1 and RS2 are identities of the source signals, and QCL_type1 and QCL_type2 are the QCL types. Each TCI state may include one or 2 source signals and the corresponding QCL types. The source signal configured in the TCI state may be the SSB or the CSI-RS, and the QCL type may be one of the 4 QCL types above.

It should be noted that if one TCI state includes two QCL types, the large-scale channel parameters corresponding to the two QCL types cannot overlap. For example, QCL-TypeA and QCL-TypeD respectively correspond to the Doppler shift, the Doppler spread, the average delay, the delay spread, and the spatial RX parameter. The large-scale channel parameters corresponding to the two QCL types do not overlap, so the two QCL types are a usable QCL type combination. However, there are overlapping large-scale channel parameters between QCL-TypeA, QCL-TypeB, and QCL-TypeC, so the QCL types cannot appear in the same TCI state. Also, the two source signals in the same TCI state may be the same. In this case, the corresponding QCL types cannot be the same.

It should be understood that the configuration of the TCI state depends on the type of the target reference signal and includes, but is not limited to, the following manners:

Configuration through radio resource control (RRC) signaling: For example, the TCI state of periodic CSI-RS/TRS is configured by the RRC signaling.

Configuration through the RRC signaling and activation by a media access control-control element (MAC-CE): For example, semi-persistent CSI-RS/TRS or a demodulation reference signal (DMRS) of the PDCCH is configured through the RRC signaling, and then indicated by the MAC-CE.

Configuration through the RRC signaling, activation by the MAC-CE, and indication by using downlink control information (DCI): For example, aperiodic CSI-RS/TRS or the DMRS of the PDSCH.

For the third configuration manner above, taking the DMRS of the PDSCH as an example, the configuration process includes:

1. The network device configures M TCI states for the terminal device through the RRC signaling, where the value of M depends on the capability of the terminal device.

It should be noted that after the initial RRC configuration, but before the MAC-CE activation, the SSB is used as a reference for the spatial RX parameter thereof.

2. Select up to 8 TCI states through the MAC-CE. The TCI states correspond to a 3-bit TCI information field in the DCI. The TCI information field is used to fill a TCI state indication. The TCI state indication is used to indicate the activated TCI state. If M is less than or equal to 8, the TCI state directly corresponds to the TCI state indication in the DCI.

3. Determine the TCI state of the PDSCH according to the DCI.

Optionally, for DCI format 1_1, if a high-level parameter tci-PresentInDCI=enabled, tci-PresentInDCI=enabled means that the DCI includes the TCI state indication. In this case, if the time (that is, a time interval or a scheduling interval) from receiving the DCI to the transmission of the corresponding PDSCH is greater than or equal to a preset threshold timeDurationForQCL, the TCI state of the PDSCH is determined according to the TCI state indication in the DCI. On the contrary, the TCI state is consistent with the TCI state in a control resource set (CORESET) with the lowest identity (ID) in a time slot including the CORESET closest to a scheduling time of the PDSCH.

Optionally, for DCI format 1_0 or the high-level parameter tci-PresentInDCI=disabled, tci-PresentInDCI=disabled means that the DCI does not include the TCI state indication. If the time from receiving the DCI to the transmission of the corresponding PDSCH is greater than or equal to the preset threshold timeDurationForQCL, the TCI state of the PDSCH is determined according to the TCI state included in the CORESET of the PDCCH scheduling the PDSCH. On the contrary, the TCI state is consistent with the TCI state in the CORESET with the lowest ID in the time slot including the CORESET closest to the scheduling time of the PDSCH.

It should be noted that for the high-level parameter tci-PresentInDCI=disabled or fallback transmission (DCI format 1_0), the TCI state of the PDSCH is always consistent with a certain CORESET (the TCI state included in the CORESET of the PDCCH scheduling the PDSCH or the CORESET with the lowest ID in the time slot including the CORESET closest to the scheduling time of the PDSCH). At this time, the TCI state of the PDSCH is equivalently configured by the RRC and activated by the MAC-CE.

Table 1 below shows the TCI state of the corresponding PDSCH in R16 combined with different DCI formats, whether there is the TCI state indication in the DCI, and different time intervals:

TABLE 1

| DCI format | Is there TCI state indication in DCI | Time interval | TCI state of PDSCH |
| --- | --- | --- | --- |
| DCI format 1_0 | No | Greater than or equal to timeDurationForQCL | According to TCI state in CORESET of PDCCH |
| DCI format 1_0 | No | Less than timeDurationForQCL | According to TCI state in CORESET with lowest ID in time slot including CORESET closest to scheduling time of PDSCH |
| DCI format 1_1 | Yes | Greater than or equal to timeDurationForQCL | According to TCI state indication in DCI |
| DCI format 1_1 | Yes | Less than timeDurationForQCL | According to TCI state in CORESET with lowest ID in time slot including CORESET closest to scheduling time of PDSCH |
| DCI format 1_1 | No | Greater than timeDurationForQCL | According to TCI state in CORESET of PDCCH |
| DCI format 1_1 | No | Less than timeDurationForQCL | According to TCI state in CORESET with lowest ID in time slot including CORESET closest to scheduling time of PDSCH |

(2) Relevant Content of PDCCH

The PDCCH in NR configures resources in units of the CORESET. The number of physical resource blocks (PRBs) occupied by the CORESET and the location of the PRB may be both flexibly selected according to network deployment, which does not need to occupy the entire system bandwidth, and is also not limited to a specific location within the system bandwidth. The CORESET is a set of physical resources for downlink control channel transmission and is configured at the granularity of 6 consecutive PRB resources. The frequency domain resources in the CORESET may be continuous or discontinuous. A time frequency resource of the CORESET may be flexibly configured, and the time domain includes 1 to 3 OFDM symbols. Within one bandwidth part, the network device may configure up to 5 CORESETs for the terminal device through a master system information (MIB), a system information block (SIB), or dedicated RRC signaling. The CORESET configured through the dedicated RRC signaling includes the following configuration parameters:

A control resource set number p, where 0≤p<12, configured through high-level signaling controlResourceSetId;

An initial value of a DMRS scrambling sequence, configured through a high-level signaling parameter pdcch-DMRS-ScramblingID;

A resource granularity of a precoder, the terminal device may assume that the DMRS within the indicated resource granularity range uses the same precoder, configured through a high-level signaling parameter precoderGranularity;

A time domain duration of the CORESET, configured through a high-level signaling parameter duration, 1, 2, or 3 OFDM symbols;

A frequency domain resource allocation of the CORESET, configured through a high-level parameter frequencyDomainResources, the location of the PRB occupied by the CORESET in the frequency domain;

Mapping of a control channel element (CCE) to a resource element group (REG), configured through a high-level parameter cce-REG-MappingType, including centralized mapping or distributed mapping.

Quasi co-location parameter information, providing QCL parameter information required to receive the DMRS of the PDCCH, specifically the TCI state of the CORESET, configured through a high-level parameter TCI-StatesPDCCH;

Indicate whether DCI Format 1-1 transmitted in the CORESET includes the TCI state indication, configured through a high-level parameter TCI-PresentInDCI.

As mentioned above, in R17, the PDCCH needs to be enhanced based on the multi TRP, so there may be the case where multiple PDCCHs perform multiple transmissions according to multiple TCI states and schedule the same PDSCH. Similarly, there is the case where at least one PDCCH schedules the same channel or the same signal according to multiple TCI states. How to determine the TCI state of the channel scheduled by or the signal triggered by the PDCCH is a technical issue to be urgently solved in the present application.

Figure 2:
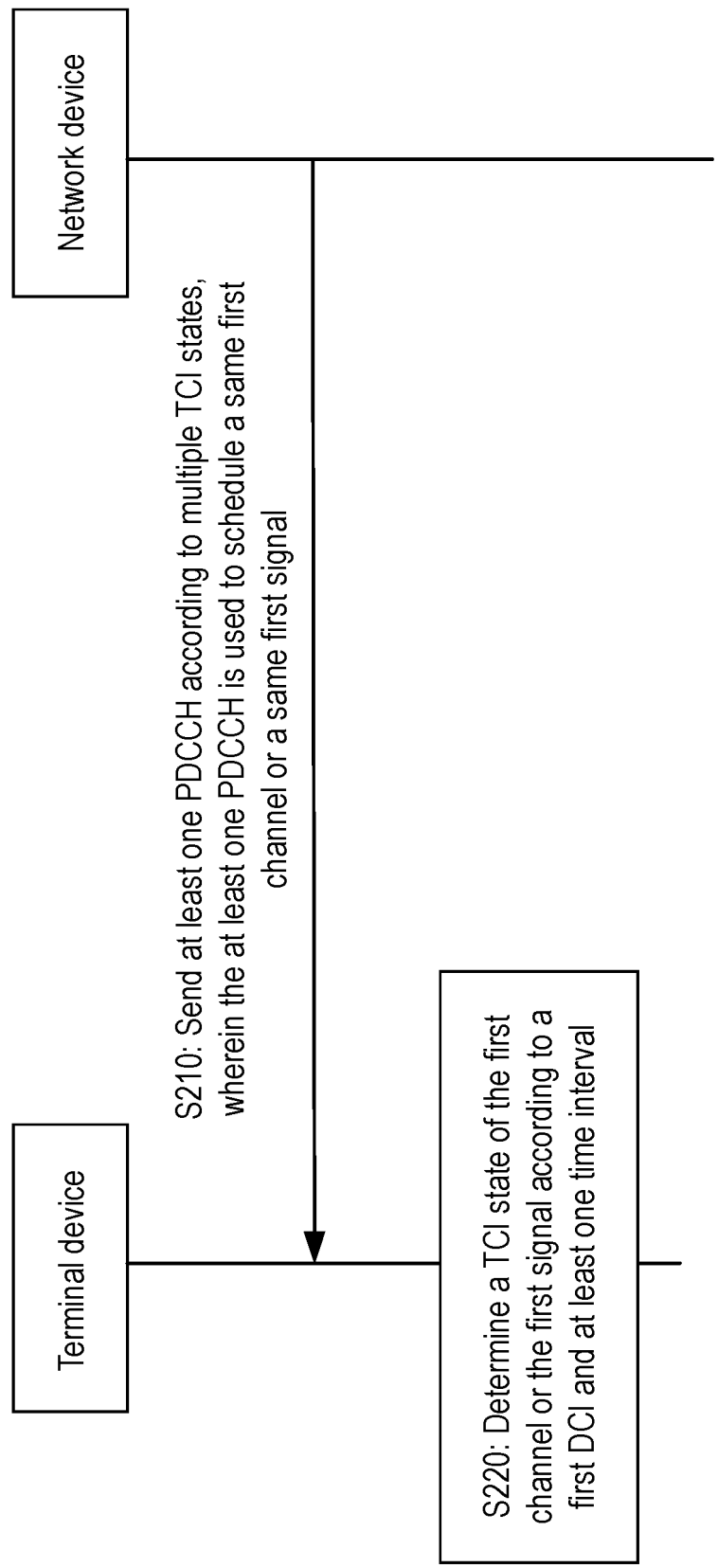
FIG. 2 is an interaction flowchart of a wireless communication method provided by an embodiment of the present application.

FIG. 2 is an interaction flowchart of a wireless communication method provided by an embodiment of the present application. As shown in FIG. 2, the method includes the following steps:

Step S210: The network device sends at least one PDCCH according to multiple TCI states. The at least one PDCCH is used to schedule the same first channel or the same first signal.

Step S220: The terminal device determines a TCI state of the first channel or the first signal according to first DCI and at least one time interval.

It should be understood that in the present application, the at least one PDCCH being used to schedule the same first signal may also be described as the at least one PDCCH being used to trigger the same first signal, which is not limited in the present application.

It should be understood that the first DCI is DCI carried on the at least one PDCCH. The at least one time interval is a time interval between the at least one PDCCH and the first channel or the at least one time interval is a time interval between the at least one PDCCH and the first signal.

It should be understood that since there is a corresponding relationship between the TCI state and a TRP or an antenna port, the at least one PDCCH sent according to the TCI states is also described as the at least one PDCCH sent through multiple TRPs or the at least one PDCCH sent through multiple antenna ports.

Optionally, the at least one PDCCH used to schedule the same first channel or trigger the same first signal is predefined and may also be indicated by the network device by adopting a dynamic or semi-static manner, which is not limited in the present application.

Optionally, the sending manner of the at least one PDCCH includes, but is not limited to, at least one of the following: a frequency division multiplexing manner, a time division multiplexing manner, a space division multiplexing manner, and a single frequency network transmission manner.

It should be understood that for one PDCCH, the sending manner includes, but is not limited to, at least one of the following: a frequency division multiplexing manner, a time division multiplexing manner, a space division multiplexing manner, and a single frequency network transmission manner.

Optionally, sending the PDCCH according to the TCI states includes, but is not limited to, at least the following cases:

1. For the PDCCH that sends a part of control information of the DCI carried on the PDCCH according to a TCI state and sends another part of the control information of the DCI carried on the PDCCH according to another TCI state, the part of the control information and the another part of the control information here are sent through at least one of the frequency division multiplexing manner, the time division multiplexing manner, the space division multiplexing manner, and the single frequency network transmission manner, but not limited thereto. It should be understood that in this case, the control information sent through the two TCI states is independently transmitted control information.

2. For the PDCCH that sends the DCI carried on the PDCCH according to two TCI states, the DCI sent according to the two TCI states may be sent through at least one of the frequency division multiplexing manner, the time division multiplexing manner, the space division multiplexing manner, and the single frequency network transmission manner, but not limited thereto. It should be understood that in this case, the control information sent according to the two TCI states is repeatedly transmitted control information.

It should be understood that for multiple PDCCHs, the sending manner between the PDCCHs includes, but is not limited to, at least one of the following: the frequency division multiplexing manner, the time division multiplexing manner, the space division multiplexing manner, and the single frequency network transmission manner; and/or the sending manner of any PDCCH includes, but is not limited to, at least one of the following: the frequency division multiplexing manner, the time division multiplexing manner, the space division multiplexing manner, and the single frequency network transmission manner.

Optionally, sending the PDCCHs according to the TCI states includes, but is not limited to, at least the following cases:

1. For the PDCCHs that send control information of a part of the PDCCHs according to a TCI state and send control information of another part of the PDCCHs according to another TCI state, optionally, the control information of the part of the PDCCHs and the control information of the another part of the PDCCHs may be both the same.

For example, DCIs carried on the PDCCHs are all the same. For example, reference time domain offsets internally carried are the same, and the offset is a reference value of a time domain offset between the PDCCH and the first channel or the first signal. The time domain offset between any PDCCH and the first signal or the first signal is obtained by adding an offset amount on the basis of the reference value.

It should be understood that the control information of the part of the PDCCHs and the control information of the another part of the PDCCHs here are sent through at least one of the frequency division multiplexing manner, the time division multiplexing manner, the space division multiplexing manner, and the single frequency network transmission manner, but not limited thereto; the control information of the part of the PDCCHs here is internally sent through at least one of the frequency division multiplexing manner, the time division multiplexing manner, the space division multiplexing manner, and the single frequency network transmission manner, but not limited thereto; and/or the control information of the another part of the PDCCHs here is internally sent through at least one of the frequency division multiplexing manner, the time division multiplexing manner, the space division multiplexing manner, and the single frequency network transmission manner, but not limited thereto.

It should be understood that in this case, the control information sent according to the two TCI states is repeatedly transmitted control information.

2. For the PDCCHs that send control information of a part of the PDCCHs according to a TCI state and send control information of another part of the PDCCHs according to another TCI state, optionally, the control information of the part of the PDCCHs here and the control information of the another part of the PDCCHs are not exactly the same. For example, the control information of the part of the PDCCHs is different from the control information of the another part of the PDCCHs, but the control information of the part of the PDCCHs is internally the same, and the control information of the another part of the PDCCHs is internally the same. Alternatively, the control information of the part of the PDCCHs is different from the control information of the another part of the PDCCHs, the control information of the part of the PDCCHs is also internally different, and the control information of the another part of the PDCCHs is also internally different.

For example, DCIs carried on the PDCCHs are all different. For example, time domain offsets between the PDCCHs and the scheduled signal or the triggered signal are internally carried. The time domain offsets may all be different.

It should be understood that the control information of the part of the PDCCHs and the control information of the another part of the PDCCHs here are sent through at least one of the frequency division multiplexing manner, the time division multiplexing manner, the space division multiplexing manner, and the single frequency network transmission manner, but not limited thereto; the control information of the part of the PDCCHs here is internally sent through at least one of the frequency division multiplexing manner, the time division multiplexing manner, the space division multiplexing manner, and the single frequency network transmission manner, but not limited thereto; and/or the control information of the another part of the PDCCHs here is internally sent through at least one of the frequency division multiplexing manner, the time division multiplexing manner, the space division multiplexing manner, and the single frequency network transmission manner, but not limited thereto.

It should be understood that in this case, the control information sent according to the two TCI states may be independently transmitted control information. For example, the DCIs carried on the PDCCHs being all different belongs to the case of independent transmission.

Optionally, the TCI states are configured by the network device for the terminal device, for example, the network device may configure one or more CORESETs for the terminal device. When one CORESET is configured, the CORESET includes the TCI states. When multiple CORESETs are configured, each CORESET may activate only one TCI state at the same time, but not limited thereto.

Optionally, the first channel may be a PDSCH, a PUSCH, a PUCCH, etc., but not limited thereto. The first signal may be an aperiodic CSI-RS, an aperiodic SRS, etc., but not limited thereto.

It should be understood that if the first channel is the PDSCH, the TCI state of the PDSCH is also referred to as the TCI state of the DMRS of the PDSCH, which is not limited in the present application.

Optionally, the terminal device may also determine the TCI state of the first channel or the first signal only according to the first DCI. For example, if the first DCI includes the TCI state indication, the activated TCI state indicated by the TCI state indication in the first DCI is determined as the TCI state of the first channel or the first signal. Alternatively, if the first DCI does not include the TCI state indication, the TCI state adopted when sending the first DCI is determined as the TCI state of the first channel or the first signal. Alternatively, regardless of whether the first DCI includes the TCI state indication, the TCI state adopted when sending the first DCI is determined as the TCI state of the first channel or the first signal.

Optionally, the terminal device may determine the TCI state of the first channel or the first signal according to the format of the DCI, whether the DCI includes the TCI state indication, and the at least one time interval.

Optionally, the format of the DCI includes: a first format and a second format. Optionally, the first format is a format 1_0 (DCI format 1_0) and the second format is a format 1_1 (DCI format 1_1). Of course, the first format may also be the format 1_1 (DCI format 1_1) and the second format may be the format 1_0 (DCI format 1_0). Alternatively, the first format and the second format are other formats, as long as they are different formats, which is not limited in the present application.

It should be understood that the TCI state indication occupying 3 bits means that the length of the TCI field in the DCI is 3 bits, which corresponds to a maximum of 8 TCI states that may be activated in the MAC CE. For example, when the value of the TCI field is 000, it indicates the first activated TCI state in the MAC CE.

Optionally, the time interval between the at least one PDCCH and the first channel includes: the time interval between each PDCCH among the at least one PDCCH and the first channel. The time interval between the at least one PDCCH and the first signal includes: the time interval between each PDCCH among the at least one PDCCH and the first signal.

It should be understood that for any PDCCH, the time interval between the PDCCH and the first channel or the first signal refers to the time interval between the transmission time of the PDCCH and the scheduling time of the first channel or the first signal.

Optionally, the transmission time of the PDCCH may be a starting transmission time, an end transmission time, or any pre-agreed time of the PDCCH, which is not limited in the present application.

Optionally, the scheduling time of the first channel or the first signal may be a starting scheduling time, an end scheduling time, or any pre-agreed time of the first channel or the first signal, which is not limited in the present application.

Exemplarily, the transmission time of the PDCCH may be the starting transmission time of the PDCCH, and the scheduling time of the first channel or the first signal may be the end scheduling time. Alternatively, the transmission time of the PDCCH may be the starting transmission time of the PDCCH, and the scheduling time of the first channel or the first signal may be the starting scheduling time. Alternatively, the transmission time of the PDCCH may be the end transmission time of the PDCCH, and the scheduling time of the first channel or the first signal may be the end scheduling time. Alternatively, the transmission time of the PDCCH may be the end transmission time of the PDCCH, and the scheduling time of the first channel or the first signal may be the starting scheduling time.

Optionally, for the first signal or the first signal, after the terminal device determines the TCI state, the first channel or the first signal may be received according to the TCI state. For example, for the PDSCH, after the terminal device determines the TCI state of the PDSCH, the large-scale channel parameter of the PDSCH may be determined, so that the filter coefficient may be adjusted to receive the PDSCH. Further, the terminal device may perform data demodulation through the DMRS of the PDSCH.

In summary, in the case of sending the at least one PDCCH according to the TCI states, in the present application, the terminal device may determine the TCI state of the first channel or the first signal according to the first DCI and the at least one time interval.

It should be understood that the terminal device may obtain one of the time intervals and may also obtain multiple time intervals. The time intervals are multiple different time intervals between the PDCCHs and the first channel, or the time intervals are multiple different time intervals between the PDCCHs and the first signal, and the PDCCHs are multiple PDCCHs sent by the network device according to the TCI states. In view of the two cases, Step S220 above is respectively described in detail:

For the case where the terminal device obtains one time interval, Step S220 above is explained:

Optionally, when the terminal device demodulates only one PDCCH, such as the first PDCCH, in this case, the terminal device also only obtains the time interval between the first PDCCH and the first channel or the first signal. Alternatively, when the terminal device demodulates multiple PDCCHs, but the PDCCHs send by adopting the frequency division multiplexing manner, in this case, since the transmission times of the PDCCHs are the same, the terminal device also only obtains one time interval. Alternatively, when the terminal device demodulates a part of multiple PDCCHs, the terminal device may obtain the transmission times of other part of the PDCCHs according to first information sent by the part of the PDCCHs and the network device, but the PDCCHs send by adopting the frequency division multiplexing manner, in this case, since the transmission times of the PDCCHs are the same, the terminal device also only obtains one time interval.

Optionally, the first information is used to indicate an association relationship between the PDCCHs.

Optionally, the association relationship includes the time domain offsets between the PDCCHs. When the PDCCHs transmit by adopting the frequency division multiplexing manner, the time domain offsets between the PDCCHs are 0.

Optionally, the first information is configured through, but is not limited to, any one of the following manners: semi-static configuration through high-level signaling, dynamic configuration, pre-negotiation by the network device and the terminal device, and pre-definition.

Optionally, when the terminal device obtains one time interval, the determination of the TCI state of the first channel or the first signal is divided into, but not limited to, the several implementable manners below:

Implementable manner 1, if the format of the DCI is the first format, the DCI does not include the TCI state indication, and the time interval is less than or equal to a preset threshold, the terminal device determines the TCI state of the scheduled channel or the triggered signal according to the TCI state of a first CORESET in a first time unit.

Optional manner 2, if the format of the DCI is the second format, the DCI does not include the TCI state indication, and the time interval is less than or equal to the preset threshold, the terminal device determines the TCI state of the scheduled channel or signal according to the TCI state of the first CORESET in the first time unit.

Optional manner 3, if the format of the DCI is the second format, the DCI includes the TCI state indication, and the time interval is less than or equal to the preset threshold, the terminal device determines the TCI state of the scheduled channel or signal according to the TCI state of the first CORESET in the first time unit.

Optional manner 4, if the format of the DCI is the first format, the DCI does not include the TCI state indication, and the time interval is greater than or equal to the preset threshold, the terminal device determines the TCI state of the first channel or the first signal according to the TCI state of the CORESET of the first PDCCH, or determine the TCI state of the scheduled channel or the triggered signal according to the TCI state of the first CORESET in the first time unit.

Optional manner 5, if the format of the DCI is the second format, the DCI does not include the TCI state indication, and the time interval is greater than or equal to the preset threshold, the terminal device determines the TCI state of the scheduled channel or the triggered signal according to the TCI state of the CORESET of the first PDCCH, or determine the TCI state of the scheduled channel or the triggered signal according to the TCI state of the first CORESET in the first time unit.

Optional manner 6, if the format of the DCI is the second format, the DCI includes the TCI state indication, and the time interval is greater than or equal to the preset threshold, the terminal device determines the TCI state of the first channel or the first signal according to the TCI state indication.

Explanation of Optional Manners 1 to 3

Optionally, in the present application, the first time unit may be one or more time slots, one or more symbols, etc., which is not limited in the present application.

Optionally, the first time unit is a time unit including the CORESET closest to the first channel or the first signal. Of course, the first time unit may also be a time unit including the CORESET that is preset at a time unit interval from the first channel or the first signal, which is not limited in the present application.

Optionally, the first time unit may include one or more CORESETs, or may not include the CORESET.

It should be understood that since the CORESET is a resource set of the PDCCH, the first time unit including the CORESET may be described as the first time unit including the PDCCH. Therefore, when the first time unit does not include the CORESET, it means that the first time unit does not include the PDCCH.

Optionally, the first CORESET is a CORESET with the smallest or largest identity in the time unit or a CORESET pre-negotiated by the network device and the terminal device, which is not limited in the present application.

It should be understood that as mentioned above, the CORESET in the present application may include one TCI state or multiple TCI states. Based on this, the terminal device may determine the TCI state of the first channel or the first signal through, but is not limited to, at least one of the following manners:

(1) If there is one TCI state of the first CORESET, the terminal device determines the TCI state of the first CORESET as the TCI state of the first channel or the first signal.

(2) Alternatively, if there are two TCI states of the first CORESET, the terminal device determines a second TCI state as the TCI state of the first channel or the first signal. The second TCI state may be a TCI state with the smallest or largest identity in the first CORESET. Of course, the second TCI state may also be the TCI state negotiated by the network device and the terminal device, the TCI state with the highest priority, etc., which is not limited in the present application.

(3) Alternatively, if there are two TCI states of the first CORESET, the terminal device determines the TCI state of a second CORESET including only one TCI state in the first time unit as the TCI state of the scheduled channel or signal. Optionally, the second CORESET is a CORESET including only one TCI state in a time unit and having the smallest or largest identity, which is not limited in the present application. If there is no second CORESET in the first time unit, the second CORESET may also be selected in the time unit including the CORESET next closest to the first channel or the first signal, and so on.

(4) Alternatively, if there are two TCI states of the first CORESET, the terminal device determines a default TCI state configured by the network device as the TCI state of the first channel or the first signal.

It should be noted that if there are two TCI states of the first CORESET, the terminal device may adopt any combination manner of (2), (3), and (4) above to determine the TCI state of the first channel or the first signal, and the combination manner is not limited in the present application. For example, the terminal device first determines the TCI state of the first channel or the first signal through (3). If the TCI state of the first channel or the first signal is not obtained, the terminal device then determines the TCI state of the first channel or the first signal through (1) or (4).

Explanation of Optional Manners 4 and 5

Optionally, the first PDCCH is a PDCCH corresponding to the time interval, that is, if the terminal device demodulates one PDCCH, the first PDCCH is the PDCCH demodulated by the terminal device. Alternatively, if the terminal device demodulates multiple PDCCHs, but the PDCCHs send by adopting the frequency division multiplexing manner, in this case, since the transmission times of the PDCCHs are the same, the first PDCCH here may be any one of the PDCCHs. Alternatively, when the terminal device demodulates a part of the PDCCHs, the terminal device may obtain the transmission times of other part of the PDCCHs according to the first information sent by the part of the PDCCHs and the network device, but the PDCCHs send by adopting the frequency division multiplexing manner, in this case, since the transmission times of the PDCCHs are the same, the first PDCCH here may also be any one of the PDCCHs.

If there is one TCI state of the CORESET of the first PDCCH, the TCI state is determined as the TCI state of the first channel or the first signal. Alternatively, if the first PDCCH transmits according to the two TCI states of the CORESET, the terminal device determines a first TCI state as the TCI state of the first channel or the first signal. Optionally, the first TCI state is a TCI state with the smallest or largest identity among the two TCI states or pre-configured by the network device. If the first PDCCH transmits through the two TCI states of the CORESET, the TCI state of the first channel or the first signal may also be determined according to the TCI state of the first CORESET in the first time unit. For the specific content of determining the TCI state of the first channel or the first signal according to the TCI state of the first CORESET in the first time unit, reference may be made to the specific explanation in Optional manners 1 to 3, which will not be repeated in the present application.

Explanation of Optional Manner 6

If there are multiple TCI state indications in the DCI, that is, when multiple activated TCI states are indicated, the terminal device may select one TCI state from the activated TCI states according to a preset rule, and determine the TCI state as the TCI state of the first channel or the first signal. The preset rule may be to select the TCI state with the largest or smallest identity or the TCI state with the highest priority, and the preset rule is not limited in the present application.

In summary, in the present application, when the terminal device obtains one time interval, the terminal device may determine the TCI state of the scheduled channel or the triggered signal according to the TCI state of the CORESET of the first PDCCH; determine the TCI state of the first channel or the first signal according to the TCI state of the first CORESET in the first time unit; or determine the TCI state of the first channel or the first signal according to the TCI state indication.

For the case where the terminal device obtains multiple time intervals, Step S220 above is explained:

Optionally, when the terminal device demodulates multiple PDCCHs, the transmission times of the PDCCHs are not exactly the same, in this case, the terminal device may obtain the time intervals between the PDCCHs and the first channel or the first signal. Alternatively, when the terminal device demodulates a part of the PDCCHs, the terminal device may obtain the transmission times of other part of the PDCCHs according to the first information sent by the part of the PDCCHs and the network device, wherein the transmission times of the PDCCHs are not exactly the same, in this case, the terminal device may obtain the time intervals between the PDCCHs and the first channel or the first signal.

For the explanation of the first information, reference may be made to the explanation of the first information when the terminal device obtains one time interval, which will not be repeated in the present application.

Optionally, when the terminal device obtains multiple time intervals, the determination of the TCI state of the first channel or the first signal is divided into, but not limited to, the several implementable manners below:

Optional manner 1, if the format of the DCI is the first format, the DCI does not include the TCI state indication, and the time interval between the earliest transmitted PDCCH among the PDCCHs and the first channel or the first signal is less than or equal to the preset threshold, the terminal device determines the TCI state of the first channel or the first signal according to the TCI state of the first CORESET in the first time unit.

Optional manner 2, if the format of the DCI is the second format, the DCI does not include the TCI state indication, and the time interval between the earliest transmitted PDCCH among the PDCCHs and the first channel or the first signal is less than or equal to the preset threshold, the terminal device determines the TCI state of the first channel or the first signal according to the TCI state of the first CORESET in the first time unit.

Optional manner 3, if the format of the DCI is the second format, the DCI includes the TCI state indication, and the time interval between the earliest transmitted PDCCH among the PDCCHs and the first channel or the first signal is less than or equal to the preset threshold, the terminal device determines the TCI state of the first channel or the first signal according to the TCI state of the first CORESET in the first time unit.

Optional manner 4, if the format of the DCI is the first format, the DCI does not include the TCI state indication, and the time interval between the latest transmitted PDCCH among the PDCCHs and the first channel or the first signal is greater than or equal to the preset threshold, the terminal device determines the TCI state of the first channel or the first signal according to the TCI state of the CORESET of the PDCCHs, or determines the TCI state of the first channel or the first signal according to the TCI state of the first CORESET in the first time unit.

Optional manner 5, if the format of the DCI is the second format, the DCI does not include the TCI state indication, and the time interval between the latest transmitted PDCCH among the PDCCHs and the first channel or the first signal is greater than or equal to the preset threshold, the terminal device determines the TCI state of the first channel or the first signal according to the TCI state of the CORESET of the PDCCHs, or determines the TCI state of the first channel or the first signal according to the TCI state of the first CORESET in the first time unit.

Optional manner 6, if the format of the DCI is the first format, the DCI does not include the TCI state indication, the time interval between the latest transmitted PDCCH among the PDCCHs and the first channel or the first signal is less than or equal to the preset threshold, and the time interval between the earliest transmitted PDCCH and the first channel or the first signal is greater than or equal to the preset threshold, the terminal device determines the default TCI state configured by the network device as the TCI state of the first channel or the first signal.

Optional manner 7, if the format of the DCI is the second format, the DCI does not include the TCI state indication, the time interval between the latest transmitted PDCCH among the PDCCHs and the first channel or the first signal is less than or equal to the preset threshold, and the time interval between the earliest transmitted PDCCH and the first channel or the first signal is greater than or equal to the preset threshold, the terminal device determines the default TCI state configured by the network device as the TCI state of the first channel or the first signal.

Optional manner 8, if the format of the DCI is the second format, the DCI includes the TCI state indication, the time interval between the latest transmitted PDCCH among the PDCCHs and the first channel or the first signal is less than or equal to the preset threshold, and the time interval between the earliest transmitted PDCCH and the first channel or the first signal is greater than or equal to the preset threshold, the terminal device determines the default TCI state configured by the network device as the TCI state of the first channel or the first signal.

Optional manner 9, if the format of the DCI is the second format, the DCI includes the TCI state indication, and the time interval between the latest transmitted PDCCH among the PDCCHs and the first channel or the first signal is greater than or equal to the preset threshold, the terminal device determines the TCI state of the first channel or the first signal according to the TCI state indication.

Explanation of Optional Manners 1 to 3

Figure 3:
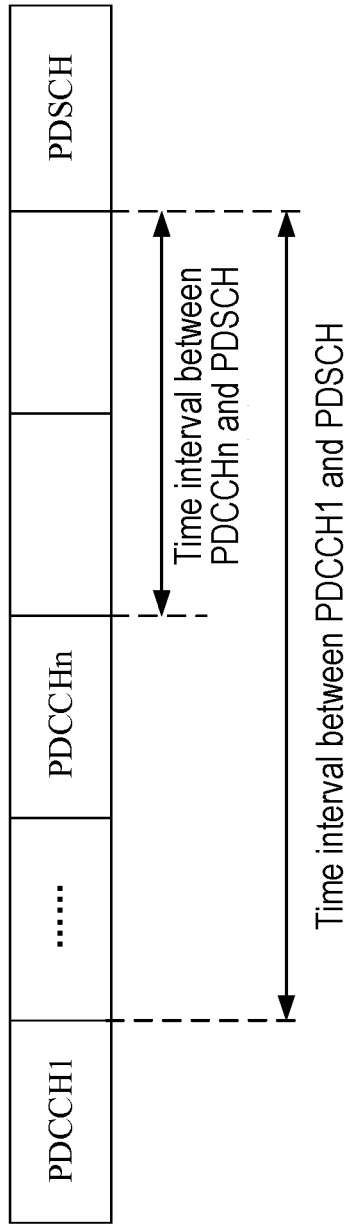
FIG. 3 is a schematic diagram of transmitting multiple PDCCHs provided by an embodiment of the present application.

Exemplarily, as shown in FIG. 3, the time interval between the earliest transmitted PDCCH (that is, PDCCH1 in FIG. 3) among the PDCCHs and the PDSCH should be greater than or equal to the time interval between other PDCCHs among the PDCCHs and the PDSCH. Therefore, when the time interval between the earliest transmitted PDCCH and the PDSCH is less than or equal to the preset threshold, it means that the time interval between each PDCCH among the PDCCHs and the PDSCH is less than or equal to the preset threshold.

It should be noted that for the explanation of the first time unit, the first time unit including the CORESET, the first CORESET, and how to determine the TCI state of the first channel or the first signal according to the TCI state of the first CORESET, reference may be made to the explanation of the first time unit, the first time unit including the CORESET, the first CORESET, and how to determine the TCI state of the first channel or the first signal according to the TCI state of the first CORESET in the case of obtaining one time interval, which will not be repeated in the present application.

Explanation of Optional Manners 4 and 5

Exemplarily, as shown in FIG. 3, the time interval between the latest transmitted PDCCH (that is, PDCCHn in FIG. 3) among the PDCCHs and the PDSCH should be less than or equal to the time interval between other PDCCHs among the PDCCHs and the PDSCH. Therefore, when the time interval between the latest transmitted PDCCH and the PDSCH is greater than or equal to the preset threshold, it means that the time interval between each PDCCH among the PDCCHs and the PDSCH is greater than or equal to the preset threshold.

As mentioned above, the PDCCHs may send through two CORESETs and each CORESET activates only one TCI state at the same time, or the PDCCHs send through one CORESET and the CORESET includes two TCI states. Based on this, the terminal device may determine the TCI state of the first channel or the first signal through, but is not limited to, at least one of the following manners:

(1) If the PDCCHs are transmitted through two CORESETs and each CORESET activates only one TCI state at the same time, the terminal device determines the TCI state included in the CORESET with the smallest identity among the two CORESETs as the TCI state of the scheduled channel or the triggered signal.

It should be understood that if the PDCCHs are transmitted through two CORESETs and each CORESET activates only one TCI state at the same time, the terminal device may also determine the TCI state included in the CORESET with the largest identity among the two CORESETs as the TCI state of the first channel or the first signal, or the terminal device selects the TCI state of one CORESET as the TCI state of the first channel or the first signal according to other preset rules, which is not limited in the present application.

(2) If the PDCCHs are transmitted through two CORESETs and each CORESET activates only one TCI state at the same time, the terminal device determines the TCI state with the smallest identity among the two CORESETs as the TCI state of the first channel or the first signal.

It should be understood that if the PDCCHs are transmitted through two CORESETs and each CORESET activates only one TCI state at the same time, the terminal device may also determine the TCI state with the largest identity among the two CORESETs as the TCI state of the first channel or the first signal, or the terminal device selects one TCI state among the two CORESETs according to other preset rules as the TCI state of the first channel or the first signal, which is not limited in the present application.

(3) If the PDCCHs are transmitted through two TCI states of one CORESET, the terminal device determines the TCI state with the smallest identity among the two TCI states as the TCI state of the first channel or the first signal.

It should be understood that if the PDCCHs are transmitted through two TCI states of one CORESET, the terminal device may also determine the TCI state with the largest identity among the two TCI states as the TCI state of the first channel or the first signal, or the terminal device may select one of the two TCI states as the TCI state of the first channel or the first signal according to other preset rules, which is not limited in the present application.

It should be noted that for the specific content of determining the TCI state of the first channel or the first signal according to the TCI state of the first CORESET in the first time unit, reference may be made to the specific explanation in Optional manners 1 to 3 in the case of obtaining one time interval, which will not be repeated in the present application.

Explanation of Optional Manners 6 to 8

Exemplarily, as shown in FIG. 3, the time interval between the latest transmitted PDCCH (that is, PDCCHn) among the PDCCHs and the PDSCH should be less than or equal to the time interval between other PDCCHs among the PDCCHs and the PDSCH, and the time interval between the earliest transmitted PDCCH (that is, PDCCH1) among the PDCCHs and the PDSCH should be greater than or equal to the time interval between other PDCCHs among the PDCCHs and the PDSCHs. Therefore, when the time interval between the latest transmitted PDCCH and the PDSCH is less than or equal to the preset threshold, and the time interval between the earliest transmitted PDCCH and the PDSCH is greater than or equal to the preset threshold, it means that among the PDCCHs, the time intervals between a part of the PDCCHs and the PDSCH is less than or equal to the preset threshold, and the time intervals between another part of the PDCCHs and the PDSCH is greater than or equal to the preset threshold. In this case, the terminal device determines the default TCI state configured by the network device as the TCI state of the PDSCH. Optionally, the default TCI state may be the TCI state pre-negotiated by the network device and the terminal device, which is not limited in the present application.

Explanation of Optional Manner 9

As shown in FIG. 3, the time interval between the latest transmitted PDCCH (that is, PDCCHn) among the PDCCHs and the PDSCH should be less than or equal to the time interval between other PDCCHs among the PDCCHs and the PDSCH. Therefore, when the time interval between the latest transmitted PDCCH and the PDSCH is greater than or equal to the preset threshold, it means that the time interval between each PDCCH among the PDCCHs and the PDSCH is greater than or equal to the preset threshold.

If there are multiple TCI state indications in the DCI, that is, when multiple activated TCI states are indicated, the terminal device may select one TCI state from the activated TCI states according to a preset rule, and determine the TCI state as the TCI state of the first channel or the first signal. The preset rule may be to select the TCI state with the largest or smallest identity, or the TCI state with the highest priority, and the preset rule is not limited in the present application.

In summary, in the present application, if the terminal device obtains multiple time intervals, the terminal device may determine the TCI state of the first channel or the first signal according to the TCI state of the first CORESET; determine the TCI state of the first channel or the first signal according to the TCI state of the CORESET of the PDCCHs; or determine the TCI state of the first channel or the first signal according to the TCI state indication. Alternatively, the terminal device determines the default TCI state configured by the network device as the TCI state of the first channel or the first signal.

It should be understood that the network device may also determine the TCI state of the first channel or the first signal according to the first DCI and the at least one time interval. The at least one PDCCH sends according to multiple TCI states, the at least one PDCCH is used to schedule the same first channel or trigger the same first signal, and the at least one time interval is the time interval between the at least one PDCCH and the first channel or the first signal. Alternatively, the network device determines the TCI state of the first channel or the first signal only according to the first DCI. Regarding how the network device specifically determines the TCI state of the first channel or the first signal, reference may be made to the method for determining the TCI state of the first channel or the first signal at the terminal device side, which will not be described in the present application.

Figure 4:
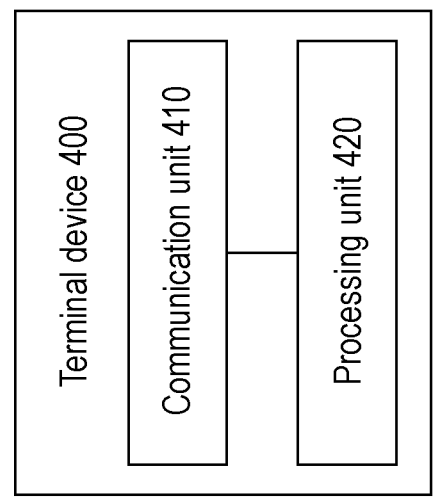
FIG. 4 shows a schematic block diagram of a terminal device 400 according to an embodiment of the present application.

FIG. 4 shows a schematic block diagram of a terminal device 400 according to an embodiment of the present application. As shown in FIG. 4, the terminal device 400 includes a communication unit 410 and a processing unit 420. The communication unit 410 is used to receive at least one PDCCH sent by the network device according to multiple TCI states, and the at least one PDCCH is used to schedule the same first channel or the same first signal. The processing unit 420 is used to determine the TCI state of the first channel or the first signal according to information of first DCI and at least one time interval. The first DCI is DCI carried on the at least one PDCCH. The at least one time interval is a time interval between the at least one PDCCH and the first channel or the at least one time interval is a time interval between the at least one PDCCH and the first signal.

Optionally, the processing unit 420 is specifically used to: determine the TCI state of the first channel or the first signal according to a format of the first DCI, whether the first DCI includes a TCI state indication, and the at least one time interval.

Optionally, the at least one time interval is one time interval, and the time interval is a time interval between a first PDCCH among the at least one PDCCH and the first channel or the first signal. Alternatively, the time interval is a time interval between multiple PDCCHs among the at least one PDCCH and the first channel or the first signal, and the time intervals between the PDCCHs and the first channel or the first signal are all the same, wherein the PDCCHs are multiple PDCCHs sent by the network device according to multiple TCI states.

Optionally, the processing unit 420 is specifically used to implement any one of the following:

If the format of the first DCI is the first format, the DCI does not include the TCI state indication, and the time interval is less than or equal to the preset threshold, the TCI state of the first channel or the first signal is determined according to a TCI state of a first control resource set (CORESET) in the first time unit.

If the format of the DCI is the second format, the DCI does not include the TCI state indication, and the time interval is less than or equal to the preset threshold, the TCI state of the first channel or the first signal is determined according to the TCI state of the first CORESET in the first time unit.

If the format of the DCI is the second format, the DCI includes the TCI state indication, and the time interval is less than or equal to the preset threshold, the TCI state of the first channel or the first signal is determined according to the TCI state of the first CORESET in the first time unit.

The first format is different from the second format.

Optionally, the processing unit 420 is specifically used to implement any one of the following:

If the format of the DCI is the first format, the DCI does not include the TCI state indication, and the time interval is greater than or equal to the preset threshold, the TCI state of the first channel or the first signal is determined according to the TCI state of the CORESET of the first PDCCH, or the TCI state of the first channel or the first signal is determined according to the TCI state of the first CORESET in the first time unit.

If the format of the DCI is the second format, the DCI does not include the TCI state indication, and the time interval is greater than or equal to the preset threshold, the TCI state of the first channel or the first signal is determined according to the TCI state of the CORESET of the first PDCCH, or the TCI state of the first channel or the first signal is determined according to the TCI state of the first CORESET in the first time unit.

The first format is different from the second format, and the first PDCCH is a PDCCH corresponding to one time interval.

Optionally, the processing unit 420 is specifically used to: if the first PDCCH transmits according to two TCI states of one CORESET, determine the first TCI state as the TCI state of the first channel or the first signal.

Optionally, the processing unit 420 is specifically used to: if the format of the DCI is the second format, the DCI includes the TCI state indication, and the time interval is greater than or equal to the preset threshold, determine the TCI state of the first channel or the first signal according to the TCI state indication.

Optionally, the at least one time interval is multiple time intervals, and the time intervals are multiple different time intervals between multiple PDCCHs and the first channel, or the time intervals are multiple different time intervals between multiple PDCCHs and the first signal, wherein the PDCCHs are multiple PDCCHs sent by the network device according to multiple TCI states.

Optionally, the PDCCHs are demodulated or a part of the PDCCHs are demodulated, and the transmission times of other PDCCHs among the PDCCHs are determined according to the first information and the part of the PDCCHs.

Optionally, the first information is used to indicate the association relationship between the PDCCHs.

Optionally, the association relationship includes time domain offsets between the PDCCHs.

Optionally, the first information is configured through any one of the following manners: semi-static configuration through high-level signaling, dynamic configuration, pre-negotiation by the network device and the terminal device, and pre-definition.

Optionally, the processing unit 420 is specifically used to implement any one of the following:

If the format of the DCI is the first format, the DCI does not include the TCI state indication, and the time interval between the earliest transmitted PDCCH among the PDCCHs and the first channel or the first signal is less than or equal to the preset threshold, the TCI state of the first channel or the first signal is determined according to the TCI state of the first CORESET in the first time unit.

If the format of the DCI is the second format, the DCI does not include the TCI state indication, and the time interval between the earliest transmitted PDCCH among the PDCCHs and the first channel or the first signal is less than or equal to the preset threshold, the TCI state of the first channel or the first signal is determined according to the TCI state of the first CORESET in the first time unit.

If the format of the DCI is the second format, the DCI includes the TCI state indication, and the time interval between the earliest transmitted PDCCH among the PDCCHs and the first channel or the first signal is less than or equal to the preset threshold, the TCI state of the first channel or the first signal is determined according to the TCI state of the first CORESET in the first time unit.

The first format is different from the second format.

Optionally, the processing unit 420 is specifically used to implement any one of the following:

If the format of the DCI is the first format, the DCI does not include the TCI state indication, and the time interval between the latest transmitted PDCCH among the PDCCHs and the first channel or the first signal is greater than or equal to the preset threshold, the TCI state of the first channel or the first signal is determined according to the TCI state of the CORESET of the PDCCHs, or the TCI state of the first channel or the first signal is determined according to the TCI state of the first CORESET in the first time unit.

If the format of the DCI is the second format, the DCI does not include the TCI state indication, and the time interval between the latest transmitted PDCCH among the PDCCHs and the first channel or the first signal is greater than or equal to the preset threshold, the TCI state of the first channel or the first signal is determined according to the TCI state of the CORESET of the PDCCHs, or the TCI state of the first channel or the first signal is determined according to the TCI state of the first CORESET in the first time unit.

The first format is different from the second format.

Optionally, the processing unit 420 is specifically used to implement any one of the following:

If the PDCCHs are transmitted through two CORESETs and each CORESET activates only one TCI state at the same time, the TCI state included in the CORESET with the smallest or largest identity among the two CORESETs is determined as the TCI state of the first channel or the first signal.

If the PDCCHs are transmitted through two CORESETs and each CORESET activates only one TCI state at the same time, the TCI state with the smallest or largest identity among the two CORESETs is determined as the TCI state of the first channel or the first signal.

If the PDCCHs are transmitted through two TCI states of one CORESET, the terminal device determines the first TCI state as the TCI state of the first channel or the first signal.

Optionally, the first TCI state is a TCI state with the smallest or largest identity among the two TCI states or pre-configured by the network device.

Optionally, the processing unit 420 is specifically used to implement any one of the following:

If the format of the DCI is the first format, the DCI does not include the TCI state indication, the time interval between the latest transmitted PDCCH among the PDCCHs and the first channel or the first signal is less than or equal to the preset threshold, and the time interval between the earliest transmitted PDCCH and the first channel or the first signal is greater than or equal to the preset threshold, the terminal device determines the default TCI state configured by the network device as the TCI state of the first channel or the first signal.

If the format of the DCI is the second format, the DCI does not include the TCI state indication, the time interval between the latest transmitted PDCCH among the PDCCHs and the first channel or the first signal is less than or equal to the preset threshold, and the time interval between the earliest transmitted PDCCH and the first channel or the first signal is greater than or equal to the preset threshold, the terminal device determines the default TCI state configured by the network device as the TCI state of the first channel or the first signal.

If the format of the DCI is the second format, the DCI includes the TCI state indication, the time interval between the latest transmitted PDCCH among the PDCCHs and the first channel or the first signal is less than or equal to the preset threshold, and the time interval between the earliest transmitted PDCCH and the first channel or the first signal is greater than or equal to the preset threshold, the terminal device determines the default TCI state configured by the network device as the TCI state of the first channel or the first signal.

The first format and the second format are different.

Optionally, the processing unit 420 is specifically used to: if the format of the DCI is the second format, the DCI includes the TCI state indication, and the time interval between the latest transmitted PDCCH among the PDCCHs and the first channel or the first signal is greater than or equal to the preset threshold, determine the TCI state of the first channel or the first signal according to the TCI state indication by the terminal device.

Optionally, the first time unit is a time unit including the CORESET closest to the first channel or the first signal.

Optionally, the first CORESET is a CORESET with the smallest or largest identity in the first time unit.

Optionally, the processing unit 420 is specifically used to implement any one of the following:

If there is one TCI state of the first CORESET, the terminal device determines the TCI state of the first CORESET as the TCI state of the first channel or the first signal.

If there are two TCI states of the first CORESET, the terminal device determines the second TCI state as the TCI state of the first channel or the first signal.

If there are two TCI states of the first CORESET, the terminal device determines the TCI state of the second CORESET including only one TCI state in the first time unit as the TCI state of the first channel or the first signal.

If there are two TCI states of the first CORESET, the terminal device determines the default TCI state configured by the network device as the TCI state of the first channel or the first signal.

Optionally, the second TCI state is a TCI state with the smallest or largest identity in the first CORESET.

Optionally, the second CORESET is a CORESET including only one TCI state in the first time unit and having the smallest or largest identity.

Optionally, the communication unit 410 is further used to receive the first channel or the first signal according to the TCI state of the first channel or the first signal.

Optionally, the first format is a format 1_0.

Optionally, the second format is a format 1_1.

Optionally, the at least one PDCCH is pre-defined for scheduling the first channel or the first signal.

Optionally, the sending manner of the at least one PDCCH includes at least one of the following: a frequency division multiplexing manner, a time division multiplexing manner, a space division multiplexing manner, and a single frequency network transmission manner.

Optionally, the at least one PDCCH carries repeatedly transmitted control information or independently transmitted control information.

Optionally, the at least one PDCCH transmits through two CORESETs and each CORESET activates only one TCI state at the same time, or the at least one PDCCH transmits through two TCI states of one CORESET.

Optionally, in some embodiments, the communication unit may be a communication interface, a transceiver, or an input/output interface of a communication chip or a system on chip. The processing unit may be one or more processors.

It should be understood that the terminal device 400 according to the embodiment of the present application may correspond to the terminal device in the method embodiment corresponding to FIG. 2, and the above and other operations and/or functions of each unit in the terminal device 400 are respectively to implement the corresponding process of the terminal device in the method embodiment corresponding to FIG. 2, which will not be repeated here for the sake of brevity.

Figure 5:
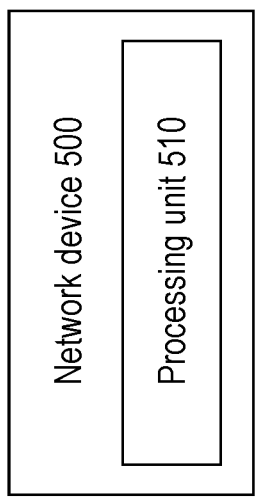
FIG. 5 shows a schematic block diagram of a network device 500 according to an embodiment of the present application.

FIG. 5 shows a schematic block diagram of a network device 500 according to an embodiment of the present application. As shown in FIG. 5, the network device 500 includes a processing unit 510. The processing unit 510 is used to determine a TCI state of a first channel or a first signal according to first DCI and at least one time interval. The first DCI is DCI carried on at least one PDCCH sent by the network device according to multiple TCI states. The at least one PDCCH is used to schedule the same first channel or the same first signal. The at least one time interval is a time interval between the at least one PDCCH and the first channel, or the at least one time interval is a time interval between the at least one PDCCH and the first signal.

Optionally, the processing unit 510 is specifically used to: determine the TCI state of the first channel or the first signal according to a format of the first DCI, whether the first DCI includes a TCI state indication, and the at least one time interval.

Optionally, the at least one time interval is a time interval, and the time interval is a time interval between one PDCCH among the at least one PDCCH and the first channel or the first signal; or the time interval is a time interval between multiple PDCCHs and the first channel or the first signal, and the time intervals between the PDCCHs and the first channel or the first signal are all the same, wherein the PDCCHs are multiple PDCCHs sent by the network device according to multiple TCI states.

Optionally, the processing unit 510 is specifically used to implement any one of the following: if the format of the first DCI is the first format, the DCI does not include the TCI state indication, and the time interval is less than or equal to the preset threshold, the TCI state of the first channel or the first signal is determined according to the TCI state of the first CORESET in the first time unit.

If the format of the DCI is the second format, the DCI does not include the TCI state indication, and the time interval is less than or equal to the preset threshold, the TCI state of the first channel or the first signal is determined according to the TCI state of the first CORESET in the first time unit.

If the format of the DCI is the second format, the DCI includes the TCI state indication, and the time interval is less than or equal to the preset threshold, the TCI state of the first channel or the first signal is determined according to the TCI state of the first CORESET in the first time unit.

The first format is different from the second format.

Optionally, the processing unit 510 is specifically used to implement any one of the following:

If the format of the DCI is the first format, the DCI does not include the TCI state indication, and the time interval is greater than or equal to the preset threshold, the TCI state of the first channel or the first signal is determined according to the TCI state of the CORESET of the first PDCCH, or the TCI state of the first channel or the first signal is determined according to the TCI state of the first CORESET in the first time unit.

If the format of the DCI is the second format, the DCI does not include the TCI state indication, and the time interval is greater than or equal to the preset threshold, the TCI state of the first channel or the first signal is determined according to the TCI state of the CORESET of the first PDCCH, or the TCI state of the first channel or the first signal is determined according to the TCI state of the first CORESET in the first time unit.

The first format is different from the second format, and the first PDCCH is a PDCCH corresponding to one time interval.

Optionally, the processing unit 510 is specifically used to: if the first PDCCH transmits according to two TCI states of one CORESET, determine the first TCI state as the TCI state of the first channel or the first signal.

Optionally, the processing unit 510 is specifically used to: if the format of the DCI is the second format, the DCI includes the TCI state indication, and the time interval is greater than or equal to the preset threshold, determine the TCI state of the first channel or the first signal according to the TCI state indication.

Optionally, the at least one time interval is multiple time intervals, and the time intervals are multiple different time intervals between multiple PDCCHs and the first channel, or the time intervals are multiple different time intervals between multiple PDCCHs and the first signal, wherein the PDCCHs are multiple PDCCHs sent by the network device according to multiple TCI states.

Optionally, the processing unit 510 is specifically used to implement any one of the following:

If the format of the DCI is the first format, the DCI does not include the TCI state indication, and the time interval between the earliest transmitted PDCCH among the PDCCHs and the first channel or the first signal is less than or equal to the preset threshold, the TCI state of the first channel or the first signal is determined according to the TCI state of the first CORESET in the first time unit.

If the format of the DCI is the second format, the DCI does not include the TCI state indication, and the time interval between the earliest transmitted PDCCH among the PDCCHs and the first channel or the first signal is less than or equal to the preset threshold, the TCI state of the first channel or the first signal is determined according to the TCI state of the first CORESET in the first time unit.

If the format of the DCI is the second format, the DCI includes the TCI state indication, and the time interval between the earliest transmitted PDCCH among the PDCCHs and the first channel or the first signal is less than or equal to the preset threshold, the TCI state of the first channel or the first signal is determined according to the TCI state of the first CORESET in the first time unit.

The first format is different from the second format.

Optionally, the processing unit 510 is specifically used to implement any one of the following:

If the format of the DCI is the first format, the DCI does not include the TCI state indication, and the time interval between the latest transmitted PDCCH among the PDCCHs and the first channel or the first signal is greater than or equal to the preset threshold, the TCI state of the first channel or the first signal is determined according to the TCI state of the CORESET of the PDCCHs, or the TCI state of the first channel or the first signal is determined according to the TCI state of the first CORESET in the first time unit.

If the format of the DCI is the second format, the DCI does not include the TCI state indication, and the time interval between the latest transmitted PDCCH among the PDCCHs and the first channel or the first signal is greater than or equal to the preset threshold, the TCI state of the first channel or the first signal is determined according to the TCI state of the CORESET of the PDCCHs, or the TCI state of the first channel or the first signal is determined according to the TCI state of the first CORESET in the first time unit.

The first format is different from the second format.

Optionally, the processing unit 510 is specifically used to implement any one of the following:

If the PDCCHs are transmitted through two CORESETs and each CORESET activates only one TCI state at the same time, the TCI state included in the CORESET with the smallest or largest identity among the two CORESETs is determined as the TCI state of the first channel or the first signal.

If the PDCCHs are transmitted through two CORESETs, and each CORESET activates only one TCI state at the same time, then determine the TCI state with the smallest or largest mark in the two CORESETs as the TCI state of the first channel or the first signal.

If the PDCCHs are transmitted through two TCI states of one CORESET, the first TCI state is determined as the TCI state of the first channel or the first signal.

Optionally, the first TCI state is a TCI state with the smallest or largest identity among the two TCI states or pre-configured by the network device.

Optionally, the processing unit 510 is specifically used to implement any one of the following:

If the format of the DCI is the first format, the DCI does not include the TCI state indication, the time interval between the latest transmitted PDCCH among the PDCCHs and the first channel or the first signal is less than or equal to the preset threshold, and the time interval between the earliest transmitted PDCCH and the first channel or the first signal is greater than or equal to the preset threshold, the default TCI state configured by the network device is determined as the TCI state of the first channel or the first signal.

If the format of the DCI is the second format, the DCI does not include the TCI state indication, the time interval between the latest transmitted PDCCH among the PDCCHs and the first channel or the first signal is less than or equal to the preset threshold, and the time interval between the earliest transmitted PDCCH and the first channel or the first signal is greater than or equal to the preset threshold, the default TCI state configured by the network device is determined as the TCI state of the first channel or the first signal.

If the format of the DCI is the second format, the DCI includes the TCI state indication, the time interval between the latest transmitted PDCCH among the PDCCHs and the first channel or the first signal is less than or equal to the preset threshold, and the time interval between the earliest transmitted PDCCH and the first channel or the first signal is greater than or equal to the preset threshold, the default TCI state configured by the network device is determined as the TCI state of the first channel or the first signal.

The first format and the second format are different.

Optionally, the processing unit 510 is specifically used to: if the format of the DCI is the second format, the DCI includes the TCI state indication, and the time interval between the latest transmitted PDCCH among the PDCCHs and the first channel or the first signal is greater than or equal to the preset threshold, determine the TCI state of the first channel or the first signal according to the TCI state indication.

Optionally, the first time unit is a time unit including the CORESET closest to the first channel or the first signal.

Optionally, the first CORESET is a CORESET with the smallest or largest identity in the first time unit.

Optionally, the processing unit 510 is specifically used to implement any one of the following:

If there is one TCI state of the first CORESET, the TCI state of the first CORESET is determined as the TCI state of the first channel or the first signal.

If there are two TCI states of the first CORESET, the second TCI state is determined as the TCI state of the scheduled channel or the triggered signal.

If there are two TCI states of the first CORESET, the TCI state of the second CORESET including only one TCI state in the first time unit is determined as the TCI state of the first channel or the first signal.

If there are two TCI states of the first CORESET, the default TCI state configured by the network device is determined as the TCI state of the first channel or the first signal.

Optionally, the second TCI state is a TCI state with the smallest or largest identity in the first CORESET.

Optionally, the second CORESET is a CORESET including only one TCI state in the first time unit and having the smallest or largest identity.

Optionally, the first format is a format 1_0.

Optionally, the second format is a format 1_1.

Optionally, the at least one PDCCH is pre-defined for scheduling the first channel or the first signal.

Optionally, the sending manner of the at least one PDCCH includes at least one of the following: a frequency division multiplexing manner, a time division multiplexing manner, a space division multiplexing manner, and a single frequency network transmission manner.

Optionally, the at least one PDCCH carries repeatedly transmitted control information or independently transmitted control information.

Optionally, the at least one PDCCH transmits through two CORESETs and each CORESET activates only one TCI state at the same time, or the at least one PDCCH transmits through two TCI states of one CORESET.

Optionally, in some embodiments, the communication unit may be a communication interface, a transceiver, or an input/output interface of a communication chip or a system on chip. The processing unit may be one or more processors.

It should be understood that the network device 500 according to the embodiment of the present application may correspond to the method embodiment of the network device side, and the above and other operations and/or functions of each unit in the network device 500 are respectively to implement the corresponding process of the network device in the method embodiment of the network device side, which will not be repeated here for the sake of brevity.

Figure 6:
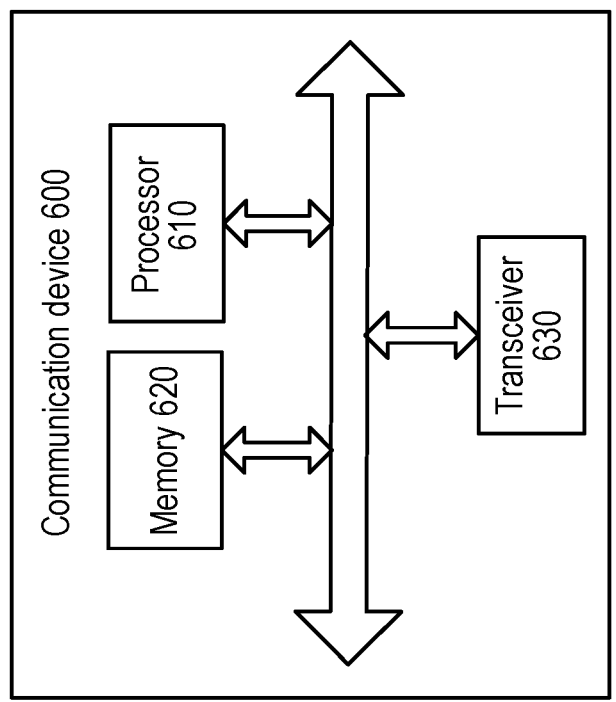
FIG. 6 is a schematic structural diagram of a communication device 600 provided by an embodiment of the present application.

FIG. 6 is a schematic structural diagram of a communication device 600 provided by an embodiment of the present application. The communication device 600 shown in FIG. 6 includes a processor 610. The processor 610 may call and run a computer program from memory to implement the method in the embodiment of the present application.

Optionally, as shown in FIG. 6, the communication device 600 may further include a memory 620. The processor 610 may call and run the computer program from the memory 620 to implement the method in the embodiment of the present application.

The memory 620 may be a separate component independent of the processor 610 or may be integrated in the processor 610.

Optionally, as shown in FIG. 6, the communication device 600 may further include a transceiver 630. The processor 610 may control the transceiver 630 to communicate with other devices, specifically, to send information or data to other devices or receive information or data sent by other devices.

The transceiver 630 may include a transmitter and a receiver. The transceiver 630 may further include an antenna, and the number of the antenna may be one or more.

Optionally, the communication device 600 may specifically be the network device of the embodiment of the present application, and the communication device 600 may implement the corresponding process implemented by the network device in each method of the embodiment of the present application, which will not be repeated here for the sake of brevity.

Optionally, the communication device 600 may specifically be the terminal device of the embodiment of the present application, and the communication device 600 may implement the corresponding process implemented by the terminal device in each method of the embodiment of the present application, which will not be repeated here for the sake of brevity.

Figure 7:
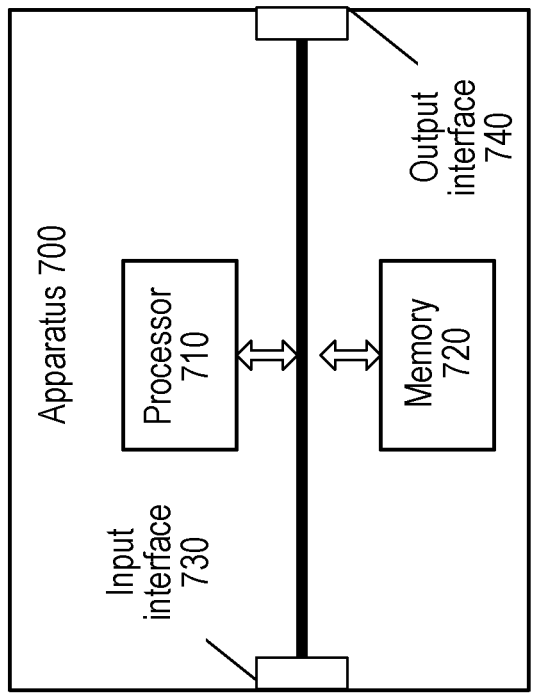
FIG. 7 is a schematic structural diagram of an apparatus of an embodiment of the present application.

FIG. 7 is a schematic structural diagram of an apparatus of an embodiment of the present application. An apparatus 700 shown in FIG. 7 includes a processor 710. The processor 710 may call and run a computer program from a memory to implement the method in the embodiment of the present application.

Optionally, as shown in FIG. 7, the apparatus 700 may further include a memory 720. The processor 710 may call and run the computer program from the memory 720 to implement the method in the embodiment of the present application.

The memory 720 may be a separate component independent of the processor 710 or may be integrated in the processor 710.

Optionally, the apparatus 700 may also include an input interface 730. The processor 710 may control the input interface 730 to communicate with other devices or chips, specifically, to obtain information or data sent by other devices or chips.

Optionally, the apparatus 700 may also include an output interface 740. The processor 710 may control the output interface 740 to communicate with other devices or chips, specifically, to output information or data to other devices or chips.

Optionally, the apparatus may be applied to the network device in the embodiment of the present application, and the apparatus may implement the corresponding process implemented by the network device in each method of the embodiment of the present application, which will not be repeated here for the sake of brevity.

Optionally, the apparatus may be applied to the terminal device in the embodiment of the present application, and the apparatus may implement the corresponding process implemented by the terminal device in each method of the embodiment of the present application, which will not be repeated here for the sake of brevity.

Optionally, the apparatus mentioned in the embodiment of the present application may also be a chip. For example, the chip may be a system-level chip, a system chip, a chip system, a system on chip, etc.

Figure 8:
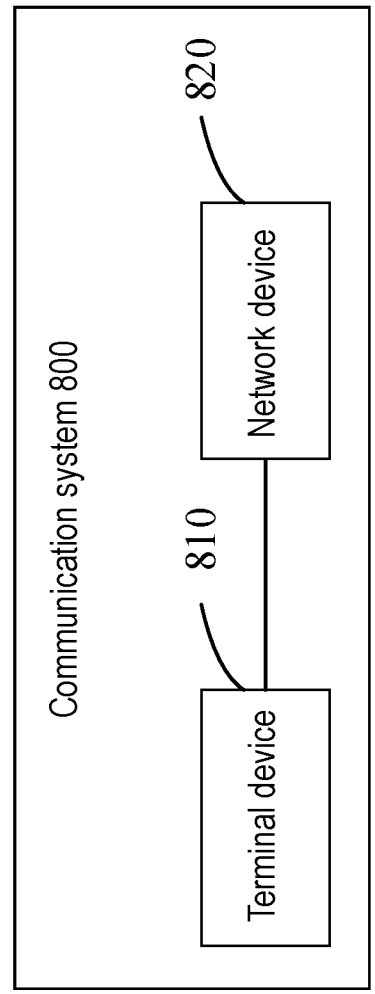
FIG. 8 is a schematic block diagram of a communication system 800 provided by an embodiment of the present application.

FIG. 8 is a schematic block diagram of a communication system 800 provided by an embodiment of the present application. As shown in FIG. 8, the communication system 800 includes a terminal device 810 and a network device 820.

The terminal device 810 may be used to implement the corresponding function implemented by the terminal device in the above method, and the network device 820 may be used to implement the corresponding function implemented by the network device or the base station in the above method, which will not be repeated here for the sake of brevity.

It should be understood that the processor in the embodiment of the present application may be an integrated circuit chip that has a signal processing capability. During the implementation process, each step of the method embodiment may be completed through an integrated logic circuit of hardware in the processor or an instruction in the form of software. The processor may be a general processor, a digital signal processor (DSP), an application specific integrated circuit (ASIC), a field programmable gate array (FPGA), or other programmable logic components, discrete gate or transistor logic components, discrete hardware assemblies. Various methods, steps, and logic block diagrams disclosed in the embodiments of the present application may be implemented or executed. The general processor may be a microprocessor, any conventional processor, etc. The steps of the method disclosed in combination with the embodiment of the present application may be directly embodied as being completed by a hardware decoding processor or completed by a combination of hardware and software modules in the decoding processor. The software module may be located in a mature storage medium in the art such as a random memory, a flash memory, a read-only memory, a programmable read-only memory, an electrically erasable programmable memory, and a register. The storage medium is located in the memory. The processor reads information in the memory and completes the steps of the above method in combination with the hardware thereof.

It may be understood that the memory in the embodiment of the present application may be a volatile memory or a non-volatile memory or may include both the volatile and non-volatile memories. The non-volatile memory may be a read-only memory (ROM), a programmable ROM (PROM), an erasable PROM (EPROM), an electrically EPROM (EEPROM), or a flash memory. The volatile memory may be a random access memory (RAM), which is used as an external cache. By way of illustration and not limitation, many forms of the RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It should be noted that the memory of the system and the method described herein is intended to include, but not be limited to, these and any other suitable types of memories.

It should be understood that the memory is an exemplary but non-limiting description. For example, the memory in the embodiment of the present application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), etc. In other words, the memory in the embodiment of the present application is intended to include, but not be limited to, these and any other suitable types of memories.

The embodiment of the present application also provides a computer-readable storage medium for storing a computer program.

Optionally, the computer-readable storage medium may be applied to the network device or the base station in the embodiment of the present application, and the computer program enables a computer to execute the corresponding process implemented by the network device or the base station in each method of the embodiment of the present application, which will not be repeated here for the sake of brevity.

Optionally, the computer-readable storage medium may be applied to a mobile terminal/the terminal device in the embodiment of the present application, and the computer program enables a computer to execute the corresponding process implemented by the mobile terminal/terminal device in each method of the embodiment of the present application, which will not be repeated here for the sake of brevity.

The embodiment of the present application also provides a computer program product, including a computer program instruction.

Optionally, the computer program product may be applied to the network device or the base station in the embodiment of the present application, and the computer program instruction enables a computer to execute the corresponding process implemented by the network device or the base station in each method of the embodiment of the present application, which will not be repeated here for the sake of brevity.

Optionally, the computer program product may be applied to the mobile terminal/terminal device in the embodiment of the present application, and the computer program instruction enables a computer to execute the corresponding process implemented by the mobile terminal/terminal device in each method of the embodiment of the present application, which will not be repeated here for the sake of brevity.

The embodiment of the present application also provides a computer program.

Optionally, the computer program may be applied to the network device or the base station in the embodiment of the present application. When the computer program is run on a computer, the computer executes the corresponding process implemented by the network device or the base station in each method of the embodiment of the present application, which will not be repeated here for the sake of brevity.

Optionally, the computer program may be applied to the mobile terminal/terminal device in the embodiment of the present application. When the computer program is run on a computer, the computer executes the corresponding process implemented by the mobile terminal/terminal device in each method of the embodiment of the present application, which will not be repeated here for the sake of brevity.

Persons skilled in the art may appreciate that units and algorithm steps of the examples described in combination with the embodiments disclosed herein can be implemented by electronic hardware or a combination of computer software and electronic hardware. Whether the functions are executed in a hardware or software manner depends on the specific application and design constraints of the technical solution. Persons skilled in the art may use a different method to implement the described function for each specific application, but such implementation should not be deemed as exceeding the scope of the present application.

Persons skilled in the art may clearly understand that for the convenience and brevity of description, for the specific working process of the above system, device, and unit, reference may be made to the corresponding process in the method embodiment, which will not be repeated here.

In the several embodiments provided by the present application, it should be understood that the disclosed system, device, and method may be implemented through other manners. For example, the device embodiment is only illustrative. For example, the division of the units is only a logical function division, and there may be other division manners during actual implementation. For example, multiple units or assemblies may be combined or integrated into another system, or some features may be omitted or not implemented. On the other hand, the shown or discussed mutual coupling, direct coupling, or communication connection may be through some interfaces, and the indirect coupling or communication connection between devices or units may be in electrical, mechanical, or other forms.

The units described as separate parts may or may not be physically separated, and the parts shown as units may or may not be physical units, that is, may be located in one place or distributed onto multiple network units. A part or all of the units may be selected according to actual requirements to implement the objective of the solution of the embodiment.

In addition, each functional unit in each embodiment of the present application may be integrated into one processing unit, each unit may physically exist separately, or two or more units may be integrated into one unit.

When the above function is implemented in the form of a software function unit and is sold or used as an independent product, the function may be stored in a computer-readable storage medium. For such an understanding, the essence of the technical solution, the part that contributes to the prior art, or a part of the technical solution may be embodied in the form of a software product. The computer software product is stored in a storage medium and includes several instructions to enable a computer device (which may be a personal computer, a server, a network device, etc.) to execute all or a part of the steps of the method described in the each embodiment of the present application. The storage medium includes: a U disk, a mobile hard disk, a read-only memory (ROM), a random access memory (RAM), a disk drive, or a compact disc, and various other media that may store program codes.

The above are only specific implementations of the present application, but the protection scope of the present application is not limited thereto. Persons skilled in the art may easily think of changes or replacements within the technical scope disclosed by the present application, which should be covered within the protection scope of the present application. Therefore, the protection scope of the present application shall be defined by the protection scope of the claims.

What is claimed is:

1. A wireless communication method, comprising:
receiving, by a terminal device, at least one physical downlink control channel (PDCCH) sent by the network device according to a plurality of transmit configuration instruction (TCI) states, wherein the at least one PDCCH is used to schedule a same first channel or a same first signal;
determining, by the terminal device, a TCI state of the first channel or the first signal according to information of first downlink control information (DCI) and at least one time interval,
wherein the first DCI is DCI carried on the at least one PDCCH; the at least one time interval is a time interval between the at least one PDCCH and the first channel or the at least one time interval is a time interval between the at least one PDCCH and the first signal;
wherein the at least one time interval is one time interval, the one time interval is a time interval between one PDCCH among the at least one PDCCH and the first channel or the first signal;
wherein determining, by the terminal device, the TCI state of the first channel or the first signal according to the information of the first DCI and the at least one time interval comprises:
if a format of the DCI is a second format, the DCI does not comprise the TCI state indication, and the one time interval is greater than or equal to a preset threshold, determining, by the terminal device, the TCI state of the first channel or the first signal according to a TCI state of a first CORESET in a first time unit;
wherein determining, by the terminal device, the TCI state of the first channel or the first signal according to the TCI state of the first CORESET in the first time unit comprises:
if there are two TCI states of the first CORESET, determining, by the terminal device, a second TCI state as the TCI state of the first channel or the first signal.

2. The method according to claim 1, wherein the at least one time interval is a plurality of time intervals, and the time intervals are a plurality of different time intervals between a plurality of PDCCHs and the first channel or the time intervals are a plurality of different time intervals between a plurality of PDCCHs and the first signal,
wherein the PDCCHs are a plurality of PDCCHs sent by the network device according to the TCI states.

3. The method according to claim 2, wherein the PDCCHs are demodulated or a part of the PDCCHs are demodulated, and transmission times of other PDCCHs among the PDCCHs are determined according to first information and the part of the PDCCHs;
wherein the first information is used to indicate an association relationship between the PDCCHs.

4. The method according to claim 3, wherein the association relationship comprises time domain offsets between the PDCCHs.

5. The method according to claim 3, wherein the first information is configured through any one of: semi-static configuration through high-level signaling, dynamic configuration, pre-negotiation by a network device and the terminal device, and pre-definition.

6. The method according to claim 2, wherein determining, by the terminal device, the TCI state of the first channel or the first signal according to the information of the first DCI and the at least one time interval comprises any one of:
if a format of the DCI is a first format, the DCI does not comprise the TCI state indication, and a time interval between an earliest transmitted PDCCH among the PDCCHs and the first channel or the first signal is less than or equal to a preset threshold, determining, by the terminal device, the TCI state of the first channel or the first signal according to the TCI state of the first CORESET in the first time unit;

if a format of the DCI is a second format, the DCI does not comprise the TCI state indication, and a time interval between an earliest transmitted PDCCH among the PDCCHs and the first channel or the first signal is less than or equal to a preset threshold, determining, by the terminal device, the TCI state of the first channel or the first signal according to the TCI state of the first CORESET in the first time unit;

if a format of the DCI is the second format, the DCI comprises the TCI state indication, and a time interval between an earliest transmitted PDCCH among the PDCCHs and the first channel or the first signal is less than or equal to a preset threshold, determining, by the terminal device, the TCI state of the first channel or the first signal according to the TCI state of the first CORESET in the first time unit, wherein the first format is different from the second format.

7. The method according to claim 2, wherein determining, by the terminal device, the TCI state of the first channel or the first signal according to the information of the first DCI and the at least one time interval comprises any one of:

if a format of the DCI is a first format, the DCI does not comprise the TCI state indication, and a time interval between a latest transmitted PDCCH among the PDCCHs and the first channel or the first signal is greater than or equal to a preset threshold, determining, by the terminal device, the TCI state of the first channel or the first signal according to a TCI state of a CORESET of the PDCCHs, or determining the TCI state of the first channel or the first signal according to the TCI state of the first CORESET in the first time unit;

if a format of the DCI is the second format, the DCI does not comprise the TCI state indication, and a time interval between a latest transmitted PDCCH among the PDCCHs and the first channel or the first signal is greater than or equal to a preset threshold, determining, by the terminal device, the TCI state of the first channel or the first signal according to a TCI state of a CORESET of the PDCCHs, or determining the TCI state of the first channel or the first signal according to the TCI state of the first CORESET in the first time unit, wherein the first format is different from the second format.

8. The method according to claim 7, wherein determining, by the terminal device, the TCI state of the first channel or the first signal according to the TCI state of the CORESET of the PDCCHs comprises any one of:

if the PDCCHs are transmitted through two CORESETs and each CORESET activates only one TCI state at a same time, determining, by the terminal device, a TCI state comprised in a CORESET with a smallest or largest identity among the two CORESETs as the TCI state of the first channel or the first signal;

if the PDCCHs are transmitted through two CORESETs and each CORESET activates only one TCI state at a same time, determining, by the terminal device, a TCI state with a smallest or largest identity among the two CORESETs as the TCI state of the first channel or the first signal;

if the PDCCHs are transmitted through two TCI states of one CORESET, determining, by the terminal device, a first TCI state as the TCI state of the first channel or the first signal.

9. The method according to claim 2, wherein determining, by the terminal device, the TCI state of the first channel or the first signal according to the information of the first DCI and the at least one time interval comprises any one of:

if a format of the DCI is a first format, the DCI does not comprise the TCI state indication, a time interval between a latest transmitted PDCCH among the PDCCHs and the first channel or the first signal is less than or equal to a preset threshold, and a time interval between an earliest transmitted PDCCH and the first channel or the first signal is greater than or equal to the preset threshold, determining, by the terminal device, a default TCI state configured by a network device as the TCI state of the first channel or the first signal;

if a format of the DCI is the second format, the DCI does not comprise the TCI state indication, a time interval between a latest transmitted PDCCH among the PDCCHs and the first channel or the first signal is less than or equal to a preset threshold, and a time interval between an earliest transmitted PDCCH and the first channel or the first signal is greater than or equal to the preset threshold, determining, by the terminal device, a default TCI state configured by a network device as the TCI state of the first channel or the first signal;

if a format of the DCI is the second format, the DCI comprises the TCI state indication, a time interval between a latest transmitted PDCCH among the PDCCHs and the first channel or the first signal is less than or equal to a preset threshold, and a time interval between an earliest transmitted PDCCH and the first channel or the first signal is greater than or equal to the preset threshold, determining, by the terminal device, a default TCI state configured by a network device as the TCI state of the first channel or the first signal, wherein the first format is different from the second format.

10. The method according to claim 2, wherein determining, by the terminal device, the TCI state of the first channel or the first signal according to the information of the first DCI and the at least one time interval comprises:

if a format of the DCI is the second format, the DCI comprises the TCI state indication, and a time interval between a latest transmitted PDCCH among the PDCCHs and the first channel or the first signal is greater than or equal to a preset threshold, determining, by the terminal device, the TCI state of the first channel or the first signal according to the TCI state indication.

11. The method according to claim 1, wherein determining, by the terminal device, the TCI state of the first channel or the first signal according to the TCI state of the first CORESET in the first time unit further comprises any one of:

if there are two TCI states of the first CORESET, determining, by the terminal device, a TCI state of a second CORESET comprising only one TCI state in the first time unit as the TCI state of the first channel or the first signal; or if there are two TCI states of the first CORESET, determining, by the terminal device, a default TCI state configured by a network device as the TCI state of the first channel or the first signal.

12. The method according to claim 1, wherein the first CORESET is a CORESET with a smallest or largest identity in the first time unit.

13. The method according to claim 1, wherein the second TCI state is a TCI state with a smallest or largest identity in the first CORESET.

14. The method according to claim 1, wherein after determining, by the terminal device, the TCI state of the first channel or the first signal according to the TCI state of the first CORESET in the first time unit, the method further comprises:
    receiving, by the terminal device, the first channel or the first signal according to the TCI state of the first channel or the first signal.

15. The method according to claim 1, wherein the second format is a format 1_1.

16. The method according to claim 1, wherein a sending method of the at least one PDCCH comprises at least one of: a frequency division multiplexing manner, a time division multiplexing manner, a space division multiplexing manner, and a single frequency network transmission manner.

17. A terminal device, comprising:
    a transceiver, configured to receive at least one physical downlink control channel (PDCCH) sent by a network device according to a plurality of transmit configuration instruction (TCI) states, wherein the at least one PDCCH is used to schedule a same first channel or a same first signal;
    a processor, configured to determine a TCI state of the first channel or the first signal according to information of first downlink control information (DCI) and at least one time interval,
    wherein the first DCI is DCI carried on the at least one PDCCH; the at least one time interval is a time interval between the at least one PDCCH and the first channel or the at least one time interval is a time interval between the at least one PDCCH and the first signal;
    wherein the at least one time interval is one time interval, the one time interval is a time interval between one PDCCH among the at least one PDCCH and the first channel or the first signal;
    wherein the processor is configured to:
    if a format of the DCI is a second format, the DCI does not comprise the TCI state indication, and the one time interval is greater than or equal to a preset threshold, determine the TCI state of the first channel or the first signal according to a TCI state of a first CORESET in a first time unit;
    wherein the processor is specifically configured to:
    if there are two TCI states of the first CORESET, determine a second TCI state as the TCI state of the first channel or the first signal.

18. A network device, comprising:
    a processor, configured to determine a transmit configuration instruction (TCI) state of a first channel or a first signal according to first downlink control information (DCI) and at least one time interval,
    wherein the first DCI is DCI carried on at least one physical downlink control channel (PDCCH) sent by the network device according to a plurality of TCI states; the at least one PDCCH is used to schedule the same first channel or the same first signal; the at least one time interval is a time interval between the at least one PDCCH and the first channel or the at least one time interval is a time interval between the at least one PDCCH and the first signal;
    wherein the at least one time interval is one time interval, the one time interval is a time interval between one PDCCH among the at least one PDCCH and the first channel or the first signal;
    wherein the processor is configured to:
    if a format of the DCI is a second format, the DCI does not comprise the TCI state indication, and the one time interval is greater than or equal to a preset threshold, determine the TCI state of the first channel or the first signal according to a TCI state of a first CORESET in a first time unit;
    wherein the processor is specifically configured to:
    if there are two TCI states of the first CORESET, determine a second TCI state as the TCI state of the first channel or the first signal.

* * * * *